United States Patent
Yan

(10) Patent No.: US 12,190,776 B1
(45) Date of Patent: Jan. 7, 2025

(54) COMPENSATION DATA DETERMINATION METHOD, BRIGHTNESS COMPENSATION METHOD, DEVICE AND STORAGE MEDIA

(71) Applicant: Hubei Yangtze Industrial Innovation Center of Advanced Display Co., LTD., Wuhan (CN)

(72) Inventor: Weinan Yan, Wuhan (CN)

(73) Assignee: Hubei Yangtze Industrial Innovation Center of Advanced Display Co., LTD., Wuhan (CN)

( * ) Notice: Subject to any disclaimer, the term of this patent is extended or adjusted under 35 U.S.C. 154(b) by 0 days.

(21) Appl. No.: 18/374,238

(22) Filed: Sep. 28, 2023

(30) Foreign Application Priority Data

Jun. 15, 2023 (CN) .......................... 202310716960.7

(51) Int. Cl.
*G09G 3/20* (2006.01)
*G06T 7/00* (2017.01)
(Continued)

(52) U.S. Cl.
CPC .............. *G09G 3/2007* (2013.01); *G06T 7/11* (2017.01); *G06T 7/90* (2017.01); *G06T 7/97* (2017.01);
(Continued)

(58) Field of Classification Search
CPC ..... G09G 2320/0233; G09G 2320/064; G09G 3/2007; G06T 2207/20056
See application file for complete search history.

(56) References Cited

U.S. PATENT DOCUMENTS 5,754,678 A * 5/1998 Hawthorne ............ G09G 3/006
348/E17.005
6,771,833 B1 * 8/2004 Edgar ....................... G06T 5/10
382/254
(Continued)

FOREIGN PATENT DOCUMENTS

| CN | 111462693 A | 7/2020 |
|---|---|---|
| CN | 114495803 A | 5/2022 |

*Primary Examiner* — William Boddie
*Assistant Examiner* — Bipin Gyawali
(74) *Attorney, Agent, or Firm* — Anova Law Group, PLLC

(57) ABSTRACT

A compensation data determination method includes obtaining first brightness data when a display panel displays a first color image and second brightness data when the display panel displays a second color image; performing a spatial domain-frequency domain conversion on the first brightness data to obtain a first frequency component corresponding to the first color image, the first frequency component including a first sub-frequency component and a second sub-frequency component; performing the spatial domain-frequency domain conversion on the second brightness data to obtain a second frequency component corresponding to the second color image, the second frequency component including a third sub-frequency component and a fourth sub-frequency component; replacing the third sub-frequency component with the first sub-frequency component and obtaining third brightness data of the second color image based on restoration of the first sub-frequency component and the fourth sub-frequency component; and obtaining first compensation data based on the third brightness data.

21 Claims, 12 Drawing Sheets

(51) Int. Cl.
  *G06T 7/11* (2017.01)
  *G06T 7/90* (2017.01)
(52) U.S. Cl.
  CPC ............ *G06T 2207/10024* (2013.01); *G06T 2207/20056* (2013.01); *G09G 2320/0233* (2013.01); *G09G 2360/16* (2013.01)

(56) References Cited

U.S. PATENT DOCUMENTS

| | | | |
|---|---|---|---|
| 11,176,908 B1* | 11/2021 | Kuo | G09G 5/02 |
| 2012/0195520 A1* | 8/2012 | Ishii | H04N 23/6811 |
| | | | 382/255 |
| 2021/0241056 A1* | 8/2021 | Miyazaki | G09G 5/10 |
| 2022/0208068 A1* | 6/2022 | Choi | G09G 3/2074 |
| 2023/0033857 A1* | 2/2023 | Jang | H04N 9/67 |
| 2023/0169929 A1* | 6/2023 | Chen | G09G 3/3406 |
| | | | 345/691 |

* cited by examiner

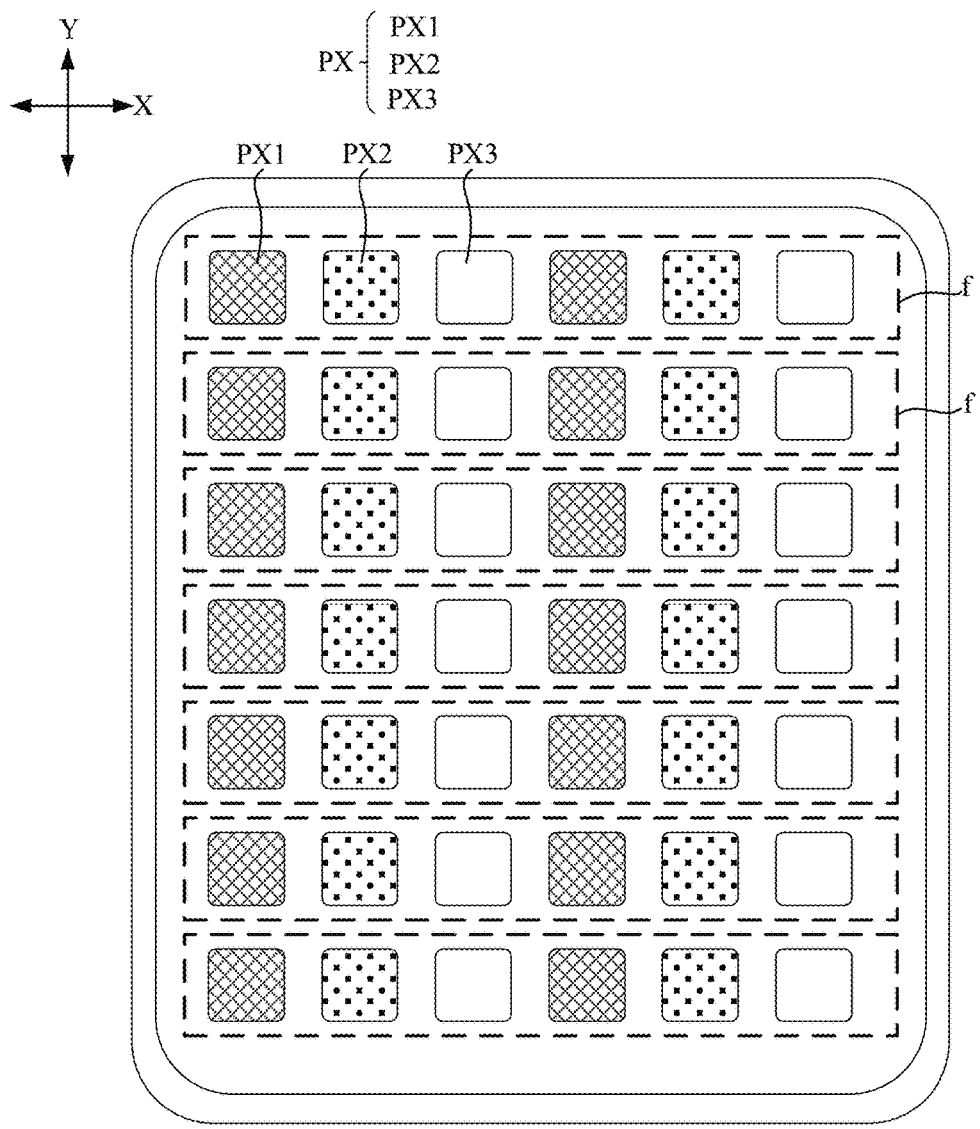

FIG. 6

| When the target region is the x1-th region, replace the third sub-frequency component corresponding to the x1-th region with the first sub-frequency component corresponding to the x1-th region, and obtain the third brightness data corresponding to the x1-th region based on the restoration of the first sub-frequency component corresponding to the x1-th region and the fourth sub-frequency component corresponding to the x1-th region | ← S701 |

↓

| When the target region is the x2-th region, replace the third sub-frequency component corresponding to the x2-th region with the first sub-frequency component corresponding to the x2-th region, and obtain the third brightness data corresponding to the x2-th region based on the restoration of the first sub-frequency component corresponding to the x2-th region and the fourth sub-frequency component corresponding to the x2-th region. | ← S702 |

FIG. 7

COMPENSATION DATA DETERMINATION METHOD, BRIGHTNESS COMPENSATION METHOD, DEVICE AND STORAGE MEDIA

CROSS-REFERENCE TO RELATED APPLICATION

This disclosure claims the priority of Chinese Patent Application No. 202310716960.7, filed on Jun. 16, 2023, the content of which is incorporated by reference in its entirety.

TECHNICAL FIELD

The present disclosure generally relates to the field of display technology and, more particularly, relates to a compensation data determination method, a brightness compensation method, and a device and storage media thereof.

BACKGROUND

With the continuous development of science and technology, various display panels have been widely used in people's life and work, bringing great convenience to people's daily life.

Due to manufacturing process factors, the light-emitting elements in a display panel and/or the thin film transistors (TFT) responsible for driving the light-emitting elements to emit light will have different characteristics, which will lead to non-uniformity in the brightness of the display panel, that is, mura. Therefore, in order to ameliorate the mura phenomenon of the display panel, it is necessary to perform optical compensation (demura) on the display panel, so as to improve the display uniformity of the display panel and improve the product yield.

However, the applicant of the present disclosure found that in some current scenarios, the compensation effect of demura is poor, and problems such as uneven brightness still exist after compensation, which greatly affects the product yield SUMMARY Embodiments of the present disclosure provide a compensation data determination method, a brightness compensation method, a device, and a storage medium, which can solve the technical problem of poor demura compensation effect.

One aspect of the present disclosure provides a compensation data determination method. The method includes obtaining first brightness data when a first color image is displayed on a display panel and second brightness data when a second color image is displayed on the display panel; performing a spatial domain-frequency domain conversion on the first brightness data to obtain a first frequency component corresponding to the first color image, where the first frequency component includes a first sub-frequency component and a second sub-frequency component, and a frequency of the first sub-frequency component is lower than a frequency of the second sub-frequency component; performing the spatial domain-frequency domain conversion on the second brightness data to obtain a second frequency component corresponding to the second color image, where the second frequency component includes a third sub-frequency component and a fourth sub-frequency component, and a frequency of the third sub-frequency component is lower than a frequency of the fourth sub-frequency component; replacing the third sub-frequency component with the first sub-frequency component and obtaining third brightness data of the second color image based on restoration of the first sub-frequency component and the fourth sub-frequency component; and obtaining first compensation data based on the third brightness data.

Another aspect of the present disclosure provides a brightness compensation method. The method includes obtaining first brightness data when a first color image is displayed on a display panel and second brightness data when a second color image is displayed on the display panel; performing a spatial domain-frequency domain conversion on the first brightness data to obtain a first frequency component corresponding to the first color image, where the first frequency component includes a first sub-frequency component and a second sub-frequency component, and a frequency of the first sub-frequency component is lower than a frequency of the second sub-frequency component; performing the spatial domain-frequency domain conversion on the second brightness data to obtain a second frequency component corresponding to the second color image, where the second frequency component includes a third sub-frequency component and a fourth sub-frequency component, and a frequency of the third sub-frequency component is lower than a frequency of the fourth sub-frequency component; replacing the third sub-frequency component with the first sub-frequency component and obtaining third brightness data of the second color image based on restoration of the first sub-frequency component and the fourth sub-frequency component; obtaining first compensation data based on the third brightness data; obtaining second compensation data based on the second brightness data; obtaining first target compensation data based on the first compensation data and the second compensation data; and compensating grayscale data of sub-pixels emitting a second color in a to-be-displayed image based on the first target compensation data.

Another aspect of the present disclosure provides a compensation data determination device. The device includes a first acquisition module configured to obtain first brightness data when a first color image is displayed on a display panel and second brightness data when a second color image is displayed on the display panel; a first conversion module configured to perform a spatial domain-frequency domain conversion on the first brightness data to obtain a first frequency component corresponding to the first color image, where the first frequency component includes a first sub-frequency component and a second sub-frequency component, and a frequency of the first sub-frequency component is lower than a frequency of the second sub-frequency component; a second conversion module configured to perform the spatial domain-frequency domain conversion on the second brightness data to obtain a second frequency component corresponding to the second color image, where the second frequency component includes a third sub-frequency component and a fourth sub-frequency component, and a frequency of the third sub-frequency component is lower than a frequency of the fourth sub-frequency component; a first restoration module configured to use the first sub-frequency component to replace the third sub-frequency component and obtain third brightness data of the second color image based on restoration of the first sub-frequency component and the fourth sub-frequency component; and a first determination module configured to determine first compensation data based on the third brightness data.

Another aspect of the present disclosure provides a brightness compensation device. The device includes a first acquisition module configured to obtain first brightness data when a first color image is displayed on a display panel and second brightness data when a second color image is displayed on the display panel; a first conversion module configured to perform a spatial domain-frequency domain conversion on the first brightness data to obtain a first frequency component corresponding to the first color image, where the first frequency component includes a first sub-frequency component and a second sub-frequency component, and a frequency of the first sub-frequency component is lower than a frequency of the second sub-frequency component; a second conversion module configured to perform the spatial domain-frequency domain conversion on the second brightness data to obtain a second frequency component corresponding to the second color image, where the second frequency component includes a third sub-frequency component and a fourth sub-frequency component, and a frequency of the third sub-frequency component is lower than a frequency of the fourth sub-frequency component; a first restoration module configured to use the first sub-frequency component to replace the third sub-frequency component and obtain third brightness data of the second color image based on restoration of the first sub-frequency component and the fourth sub-frequency component; a first determination module configured to determine first compensation data based on the third brightness data; a second determination module configured to determine second compensation data based on the second brightness data; a third determination module configured to determine first target compensation data based on the first compensation data and the second compensation data; and a compensation module configured to compensata grayscale data of sub-pixels emitting a second color in a to-be-displayed image based on the first target compensation data.

Another aspect of the present disclosure provides a display device. The display device includes a processor; a memory, containing a computer program stored on the memory and executable on the processor, where the computer program, when executed by the processor, implements the compensation data determination method or the brightness compensation method described above.

Another aspect of the present disclosure provides a computer-readable storage medium, on which a computer program is stored, and when the computer program is executed by a processor, the compensation data determination method or the brightness compensation method described above is implemented.

Other aspects of the present disclosure can be understood by those skilled in the art in light of the description, the claims, and the drawings of the present disclosure.

BRIEF DESCRIPTION OF THE DRAWINGS

In order to illustrate the technical solutions of the embodiments of the present disclosure more clearly, the accompanying drawings used in the embodiments of the present disclosure shall be briefly introduced below. It should be obvious to those skilled in the art that, other drawings may also be obtained based on these drawings without creative effort.

FIG. 6 is a schematic diagram illustrating a structure of a display panel according to some embodiments of the disclosure.

FIG. 7 is a flowchart of a method for performing step S204 in the compensation data determination method according to some embodiments of the disclosure.

DETAILED DESCRIPTION

Figure 1:
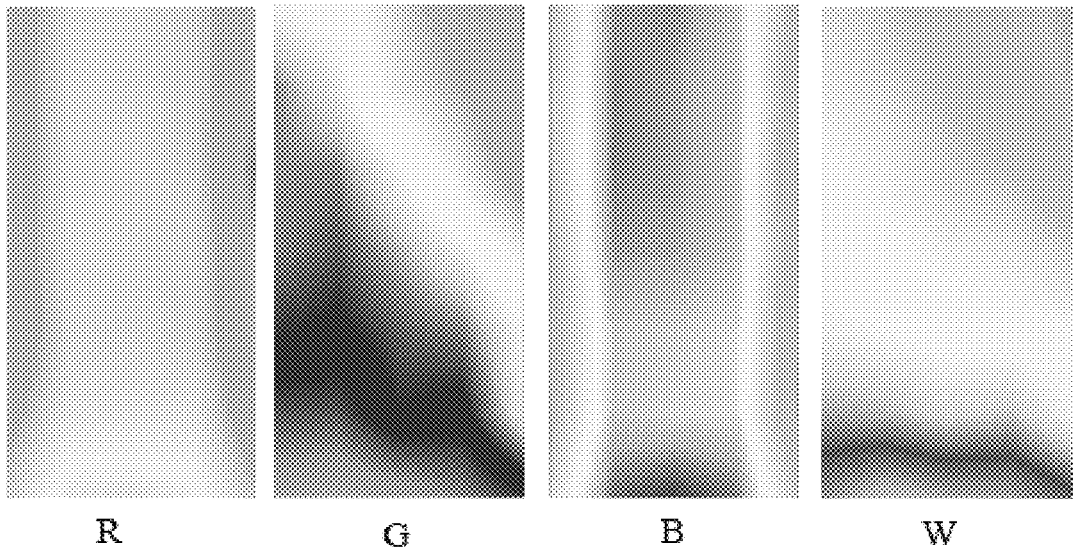
FIG. 1 shows exemplary brightness distribution patterns of different color images.

The features and exemplary embodiments of various aspects of the present disclosure will be described in detail below. The purpose, technical solutions, and advantages of the present disclosure will be made apparent by the following detailed description in conjunction with the accompanying drawings and specific embodiments. It should be understood that the specific embodiments described herein are intended to explain the present disclosure rather than limit the scope of the present disclosure. For those skilled in the art, the present disclosure may be implemented without certain specific details described here. The description of the embodiments below is merely intended to provide a better understanding of the present disclosure through exemplary embodiments.

It should be noted that in this document, terms such as "first" and "second" are used merely to distinguish one entity or operation from another entity or operation, and do not necessarily imply any actual relationship or order between these entities or operations. In addition, the terms "including," "comprising" or any other variations thereof are intended to cover non-exclusive inclusion, such that a process, method, article, or device comprising a series of elements may include additional elements not explicitly listed, or may include elements that are inherently present in such process, method, article, or device. Unless specifically stated otherwise, the elements limited by the statement "including . . ." do not exclude the presence of additional similar elements in the process, method, article, or device comprising the elements.

It should be understood that the term "and/or" used in this document is merely a description of the association relationship between associated objects, indicating that all three relationships may exist. For example, "A and/or B" may mean A exists alone, A and B exist simultaneously, and B exists alone. Furthermore, the character "/" in this specification generally indicates an "or" relationship between the preceding and following associated objects.

Various modifications and changes may be made to this disclosure without departing from the spirit or scope of this disclosure, which is obvious to those skilled in the art. Therefore, this disclosure intends to cover modifications and changes to this disclosure falling within the scope of the corresponding claims and equivalents thereof. It should be noted that the embodiments provided in this disclosure may be combined with each other as long as they are not contradictory.

Before discussing the technical solutions provided by the embodiments of this disclosure, in order to facilitate the understanding of the embodiments of this disclosure, this disclosure first specifically explains the problems existing in the related art.

Due to certain processing factors, there may be differences in characteristics between the light-emitting elements and/or thin-film transistors (TFTs) responsible for driving the light-emitting elements in a display panel, which results in non-uniform brightness of the display panel, which is also referred to as mura. In order to ameliorate the mura phenomenon of a display panel, optical compensation (i.e., demura) needs to be performed on the display panel to improve the display uniformity of the display panel and enhance the yield of the product.

During compensation, it is usually necessary to take full-screen photos of various monochrome images (such as red monochrome images, green monochrome images, and blue monochrome images) of the display panel at different brightness levels respectively, in order to obtain the emission characteristics of each sub-pixel or region, and then calculate the brightness information to be compensated for each sub-pixel or region, so that the emission brightness of each sub-pixel or region in a target color image is the same or similar, thus improving the display uniformity of the entire display panel.

However, the applicant of this disclosure has found that the load characteristics (or brightness distribution pattern) of some color monochrome images are different from the load characteristics (or brightness distribution pattern) of a target color image used to validate the compensation effect.

FIG. 1 schematically shows the brightness distribution patterns of different color images. In the figure, R represents a red monochrome image, G represents a green monochrome image, B represents a blue monochrome image, and W represents a white image.

In the example shown in FIG. 1, the target color image used to validate the compensation effect is a white image, which shows light load characteristics, i.e., in the brightness distribution pattern aspect, a phenomenon of dark on both sides and bright in the middle is not so obvious. Similarly, the green monochrome image also shows light load characteristics, i.e., in the brightness distribution pattern aspect, a phenomenon of dark on both sides and bright in the middle is not so obvious. However, the red monochrome image and the blue monochrome image show heavy load characteristics, i.e., in the brightness distribution pattern aspect, a phenomenon of dark on both sides and bright in the middle is more obvious.

In the compensation in the related art, the load characteristics (or brightness distribution pattern) of different color monochrome images are ignored, and the load characteristics (or brightness distribution pattern) of these color monochrome images with heavy load characteristics (such as red monochrome images and blue monochrome images) are not effectively compensated, resulting in poor compensation effect. For example, after compensation, the red sub-pixels and/or blue sub-pixels still exhibit the phenomenon of dark on both sides and bright in the middle, which leads to color deviation and/or uneven brightness, greatly affecting the quality of the product.

In view of the above discovery by the applicant, embodiments of this disclosure provide compensation data determination methods, brightness compensation methods, a device, and a storage medium to solve the technical problems of poor compensation effect in the related art.

The technical concept of the present disclosure is as follows: performing a spatial domain-frequency domain conversion on first brightness data of a first color image to obtain a first frequency component corresponding to the first color image, which includes a first sub-frequency component and a second sub-frequency component with a frequency of the first sub-frequency component lower than the frequency of the second sub-frequency component; performing a spatial domain-frequency domain conversion on second brightness data of a second color image to obtain a second frequency component corresponding to the second color image, which includes a third sub-frequency component and a fourth sub-frequency component, with a frequency of the third sub-frequency component lower than the frequency of the fourth sub-frequency component. By replacing the third sub-frequency component of the second color image with the first sub-frequency component of the first color image, and obtaining third brightness data of the second color image based on restoration of the first and fourth sub-frequency components, it is possible to transform the load characteristics (brightness distribution pattern) of the second color image to be similar or close to the load characteristics of an image used to validate the demura compensation effect, thereby compensating for or offsetting at least some of the difference in load characteristics (or brightness-changing pattern) in the second color image. This ameliorates the inaccuracy issue of the determined compensation data caused by different load characteristics (or brightness distribution patterns) and enhances the compensation effect of demura.

Next, the methods for determining compensation data provided in the embodiments of the present disclosure will be first described.

Figure 2:
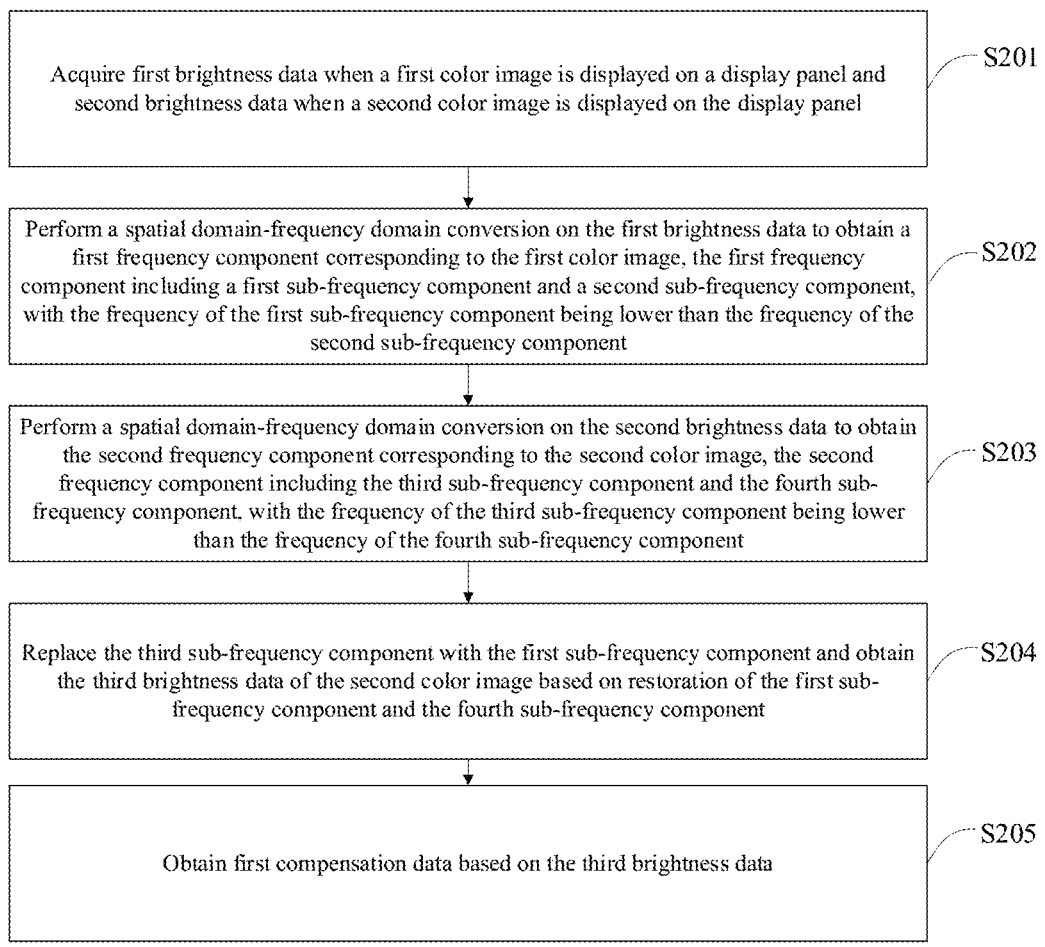
FIG. 2 is a flowchart of a compensation data determination method according to some embodiments of the disclosure.

FIG. 2 is a flowchart illustrating a compensation data determination method according to some embodiments of the present disclosure.

As shown in FIG. 2, the compensation data determination method may include the following steps S201-S205.

S201: Acquire first brightness data when a first color image is displayed on a display panel and second brightness data when a second color image is displayed on the display panel.

As mentioned before, the red monochrome image and blue monochrome image exhibit heavy load characteristics, while the white image and green monochrome image exhibit light load characteristics. By way of example, the first color image may be a white image or a green monochrome image, while the second color image may be a red monochrome image or a blue monochrome image.

In step S201, the first brightness data when the first color image is displayed on the display panel and the second brightness data when the second color image is displayed on the display panel may be obtained through optical measuring equipment such as a camera or a color analyzer. In some embodiments, the first brightness data of the first color image and the second brightness data of the second color image may be obtained for the same grayscale (or the same brightness level).

S202: Perform a spatial domain-frequency domain conversion on the first brightness data to obtain a first frequency component corresponding to the first color image, the first frequency component including a first sub-frequency component and a second sub-frequency component, with the frequency of the first sub-frequency component being lower than the frequency of the second sub-frequency component. By performing a spatial domain-frequency domain conversion on the first brightness data, a first frequency component corresponding to the first color image may be obtained.

The first frequency component may be divided into a first sub-frequency component and a second sub-frequency component. Specifically, the frequency of the first sub-frequency component is lower than the frequency of the second sub-frequency component. In other words, the first sub-frequency component may be referred to as the low-frequency component, and the second sub-frequency component may be referred to as the high-frequency component.

Figure 3:
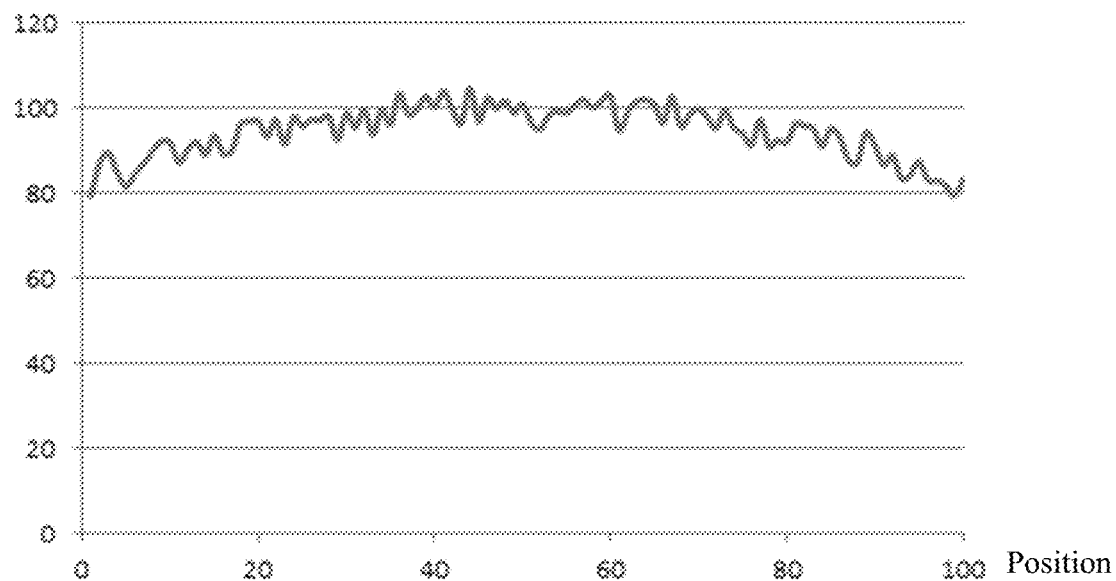
FIG. 3 shows a first frequency component corresponding to an i-th row sub-pixel in a first color image according to some embodiments of the disclosure.
Figure 4:
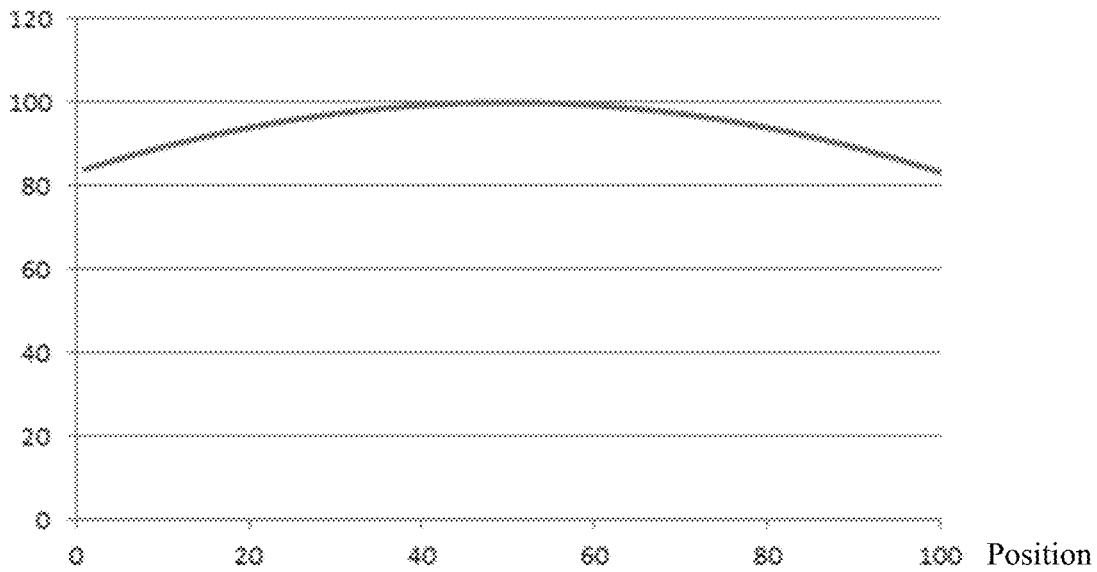
FIG. 4 shows a first sub-frequency component corresponding to the i-th row sub-pixel in the first color image according to some embodiments of the disclosure.
Figure 5:
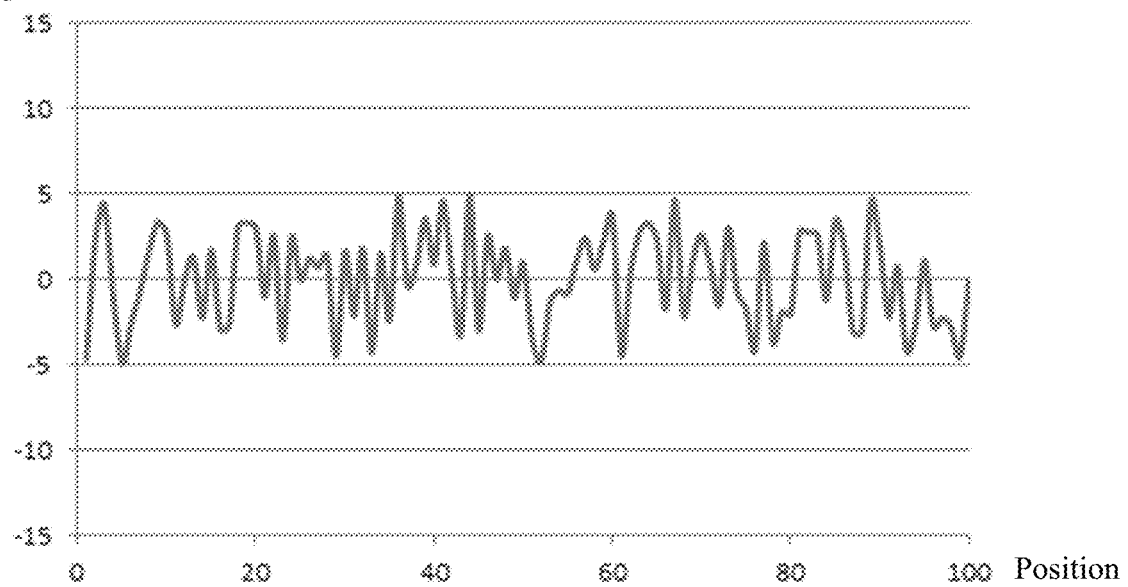
FIG. 5 shows a second sub-frequency component corresponding to the i-th row sub-pixel in the first color image according to some embodiments of the disclosure.

FIG. 3 shows the first frequency component corresponding to an i-th row sub-pixel in the first color image, where i is a positive integer. FIG. 4 shows the first sub-frequency component corresponding to the i-th row sub-pixel in the first color image. FIG. 5 shows the second sub-frequency component corresponding to the i-th row sub-pixel in the first color image. In the examples shown in FIG. 3 to FIG. 5, the horizontal axis represents position, and the vertical axis represents brightness. As shown in FIG. 3, the first frequency component not only contains high-frequency brightness jumping (i.e., brightness variations caused by mura), but also includes brightness variations caused by load, such as dark on both sides and bright in the middle, although the degree of brightness variation is relatively slight for the first color image.

As shown in FIG. 4 and FIG. 5, the first frequency component may be divided into the first sub-frequency component and the second sub-frequency component, namely, the low-frequency component and the high-frequency component. The first sub-frequency component may represent the brightness-changing pattern caused by the load for the first color image, while the second sub-frequency component may represent the brightness non-uniformity caused by mura for the first color image. In other words, the first sub-frequency component may reflect the overall brightness-changing pattern, while the second sub-frequency component may reflect finer local brightness variations along with the overall brightness-changing pattern.

S203: Perform a spatial domain-frequency domain conversion on the second brightness data to obtain the second frequency component corresponding to the second color image, the second frequency component including the third sub-frequency component and the fourth sub-frequency component, with the frequency of the third sub-frequency component being lower than the frequency of the fourth sub-frequency component.

Similarly, spatial domain-frequency domain conversion may be applied to the second brightness data to obtain the second frequency component corresponding to the second color image. The second frequency component may be divided into the third sub-frequency component and the fourth sub-frequency component. The frequency of the third sub-frequency component is lower than the frequency of the fourth sub-frequency component. Therefore, the third sub-frequency component may be referred to as the low-frequency component, and the fourth sub-frequency component may be referred to as the high-frequency component.

The third sub-frequency component may represent the brightness-changing pattern caused by the load on the second color image, while the fourth sub-frequency component may represent the brightness non-uniformity caused by mura on the second color image.

S204: Replace the third sub-frequency component with the first sub-frequency component and obtain the third brightness data of the second color image based on restoration of the first sub-frequency component and the fourth sub-frequency component.

After obtaining the first sub-frequency component of the first color image and the third sub-frequency component of the second color image, the third sub-frequency component of the second color image may be replaced with the first sub-frequency component of the first color image. In other words, for the low-frequency component of the second color image, the third sub-frequency component is replaced with the first sub-frequency component, so as to replace the low-frequency component for the second color image.

In S204, a new frequency component of the second color image may be synthesized based on the first sub-frequency component and the fourth sub-frequency component. Then, by performing a frequency domain-spatial domain conversion on the new frequency component of the second color image, a reconstructed third brightness data for the second color image may be obtained.

Since the third sub-frequency component is replaced with the first sub-frequency component for the low-frequency component of the second color image, the load characteristics (or brightness distribution pattern) of the reconstructed third brightness data for the second color image are similar or close to the load characteristics of the first brightness data of the first color image. This compensates for or at least partially offsets the load characteristics difference or brightness-changing pattern difference between the second color image and the first color image.

S205: Obtain first compensation data based on the third brightness data.

As described above, the third brightness data has already compensated for or at least partially offset the load characteristics difference or brightness-changing pattern difference between the second color image and the first color image. However, there may still exist brightness non-uniformity caused by mura. Therefore, in order to improve the brightness non-uniformity caused by mura, the third brightness data may be used to perform compensation to obtain the first compensation data.

The methods for determining compensation data in the disclosed embodiments involve replacing the third sub-frequency component of the second color image with the first sub-frequency component of the first color image, and obtaining the third brightness data of the second color image based on restoration of the first and fourth sub-frequency components. This may achieve a transformation of the load characteristics (or brightness distribution pattern) of the second color image to be similar or close to the load characteristics (or brightness distribution pattern) of the image used to validate the compensation effect. It compensates, or at least partially offsets, the difference in load characteristics or the difference in the brightness-changing pattern of the second color image, thereby ameliorating the inaccuracy issue of the determined compensation data caused by different load characteristics (or brightness distribution pattern), thereby enhancing the compensation effect of demura.

The applicant of the present disclosure further recognizes that there may be differences in brightness between different positions or regions in a display panel. In view of this, in some embodiments, the display panel may be divided into multiple regions, and the low-frequency component of a j-th region obtained when displaying the first color image on the display panel may replace the low-frequency component of the j-th region obtained when displaying the second color image on the display panel, where j is a positive integer. This achieves the replacement of the low-frequency components of the same region.

Due to the recognition of the brightness distribution pattern showing dark on both sides and bright in the middle, namely the brightness distribution pattern changes along the row direction, in order to achieve precise compensation for the brightness distribution pattern, when dividing the display panel into multiple regions, it is possible to divide the display panel into sequentially arranged regions along the column direction, where each region may include at least one row of sub-pixels.

FIG. 6 is a schematic diagram illustrating a structure of the display panel, according to some embodiments of the present disclosure. As shown in FIG. 6, according to some embodiments of this disclosure, optionally, the display panel may include multiple regions f sequentially arranged along the column direction Y of the display panel. A region f may include at least one row of sub-pixels (PX)

FIG. 6 illustrates an example where a region f includes one row of sub-pixels PX. However, the number of rows of sub-pixels PX in a region f may be flexibly adjusted depending on the actual situation, which is not limited in the present disclosure. A row of sub-pixels PX may include sub-pixels of multiple colors arranged along the row direction X, such as red sub-pixels PX1, green sub-pixels PX2, and/or blue sub-pixels PX3.

Correspondingly, the first brightness data may include the brightness data of a target region when the display panel displays the first color image, and the second brightness data may include the brightness data of a target region when the display panel displays the second color image. The target region may be any region among the multiple regions.

In other words, for any region in multiple regions, the replacement of the low-frequency component of the region may be achieved and the corresponding first compensation data may be obtained based on steps S201-S205.

Specifically, in S201, the first brightness data of the target region when the display panel displays the first color image and the second brightness data of the target region when the display panel displays the second color image may be obtained.

In S202, the first brightness data of the target region may be converted from spatial domain to frequency domain to obtain the first frequency component corresponding to the target region when the display panel displays the first color image. The first frequency component includes the first sub-frequency component and the second sub-frequency component, with the frequency of the first sub-frequency component being lower than the frequency of the second sub-frequency component.

In S203, the second brightness data of the target region may be converted from spatial domain to frequency domain to obtain the second frequency component corresponding to the target region when the display panel displays the second color image. The second frequency component includes the third sub-frequency component and the fourth sub-frequency component, with the frequency of the third sub-frequency component being lower than the frequency of the fourth sub-frequency component.

In S204, the first sub-frequency component corresponding to the target region may be used to replace the third sub-frequency component corresponding to the target region, and the third brightness data of the target region may be obtained based on the restoration of the first sub-frequency component and the fourth sub-frequency component corresponding to the target region.

In S205, the first compensation data of the target region, when the display panel displays the second color image, may be obtained based on the restored third brightness data of the target region.

The specific processes of steps S201-S205 have been described in detail above and will not be reiterated here.

In this way, the first sub-frequency component corresponding to the first region of the display panel when the first color image is displayed may replace the third sub-frequency component corresponding to the first region of the display panel when the second color image is displayed. The first sub-frequency component corresponding to the second region of the display panel when displaying the first color image may replace the third sub-frequency component corresponding to the second region of the display panel when displaying the second color image, . . . , the first sub-frequency component corresponding to the n-th region of the display panel when displaying the first color image may replace the third sub-frequency component corresponding to the n-th region of the display panel when displaying the second color image, where n is a positive integer. This allows to achieve accurate compensation for the brightness distribution pattern, so as to better compensate for or offset the difference in load characteristics of the second color image or the difference in brightness change pattern, thereby improving the compensation effect of demura.

In some embodiments, optionally, multiple regions of a display panel may include an x1-th region and an x2-th region, where x1 and x2 are positive integers, x1≠x2.

FIG. 7 is a flowchart of a method for step S204 in determining compensation data according to some embodiments of the present disclosure. As shown in FIG. 7, step S204 of replacing the third sub-frequency component with the first sub-frequency component and obtaining the third brightness data of the second color image based on the restoration of the first sub-frequency component and the fourth sub-frequency component may specifically include the following steps S701 and S702.

S701: When the target region is the x1-th region, replace the third sub-frequency component corresponding to the x1-th region with the first sub-frequency component corresponding to the x1-th region, and obtain the third brightness data corresponding to the x1-th region based on the restoration of the first sub-frequency component corresponding to the x1-th region and the fourth sub-frequency component corresponding to the x1-th region.

For example, after obtaining the first sub-frequency component, the third sub-frequency component, and the fourth sub-frequency component corresponding to the x1-th region, the first sub-frequency component corresponding to the x1-th region may be used to replace the third sub-frequency component corresponding to the x1-th region. The third brightness data corresponding to the x1-th region is obtained based on the restoration of the first sub-frequency component corresponding to the x1-th region and the fourth sub-frequency component corresponding to the x1-th region.

S702: When the target region is the x2-th region, replace the third sub-frequency component corresponding to the x2-th region with the first sub-frequency component corresponding to the x2-th region, and obtain the third brightness data corresponding to the x2-th region based on the restoration of the first sub-frequency component corresponding to the x2-th region and the fourth sub-frequency component corresponding to the x2-th region.

For example, after obtaining the first sub-frequency component, the third sub-frequency component, and the fourth sub-frequency component corresponding to the x2-th region, the first sub-frequency component corresponding to the x2-th region may be used to replace the third sub-frequency component corresponding to the x2-th region. The third brightness data corresponding to the x2-th region is obtained based on the restoration of the first sub-frequency component corresponding to the x2-th region and the fourth sub-frequency component corresponding to the x2-th region.

Correspondingly, step S205 of obtaining the first compensation data according to the third brightness data may specifically include the following steps 1 and 2.

Step 1: Obtain the first compensation data corresponding to the x1-th region according to the third brightness data corresponding to the x1-th region.

Step 2: Obtain the first compensation data corresponding to the x2-th region according to the third brightness data corresponding to the x2-th region.

In this way, the first sub-frequency component corresponding to the x1-th region when the first color image is displayed on the display panel may replace the third sub-frequency component corresponding to the x1-th region when the second color image is displayed on the display panel. The first sub-frequency component corresponding to the x2-th region when the first color image is displayed on the display panel may replace the third sub-frequency component corresponding to the x2-th region when the second color image is displayed on the display panel. This allows for precise compensation of the brightness distribution pattern of different regions, compensating for or offsetting the load characteristics difference or brightness change pattern difference of the second color image, thereby improving the compensation effect of demura.

In some embodiments, optionally, in order to reduce computational complexity and improve the efficiency of determining the first compensation data, the average brightness of multiple rows of sub-pixels on the display panel may be calculated to obtain a unified first sub-frequency component when the display panel displays the first color image. This unified first sub-frequency component may then replace the third sub-frequency component of multiple rows of sub-pixels or even all rows of sub-pixels on the display panel when the second color image is displayed on the display panel.

Specifically, the display panel may include multiple rows of sub-pixels. The first brightness data may include the average value of the brightness data of at least one row of sub-pixels on the display panel when the first color image is displayed on the display panel. For example, the first brightness data may include the average value of the brightness data of multiple rows of sub-pixels when the first color image is displayed on the display panel, such as N1 rows of sub-pixels, where N1 is an integer greater than 1. Assume that one row of sub-pixels includes M1 sub-pixels, where M1 is an integer greater than 1, indicating that the display panel includes M1 columns of sub-pixels. Then the average value of the brightness data of N1 sub-pixels in the 1st column of sub-pixels, the average value of the brightness data of N1 sub-pixels in the 2nd column of sub-pixels, ..., and the average value of the brightness data of N1 sub-pixels in the M1-th column of sub-pixels may be sequentially calculated.

For example, let $L_1$ represent the average value of the brightness data of N1 sub-pixels in the 1st column of sub-pixels, $L_2$ represent the average value of the brightness data of N1 sub-pixels in the 2nd column of sub-pixels, ..., and $L_{M1}$ represent the average value of the brightness data of N1 sub-pixels in the M1-th column of sub-pixels, then, the unified first brightness data may be represented as $(L_1, L_2, \ldots, L_{M1})$.

The second brightness data may include the brightness data of multiple rows of sub-pixels when the second color image is displayed on the display panel.

Correspondingly, in S202, the first brightness data $(L_1, L_2, \ldots, L_{M1})$ may be converted from spatial domain to frequency domain to obtain the first frequency component corresponding to the first color image. The first frequency component may be divided into the first sub-frequency component and the second sub-frequency component.

Similarly, in S203, the second brightness data is transformed from spatial domain to frequency domain to obtain the second frequency component corresponding to the second color image. This process may include the following steps:

Perform the spatial domain to frequency domain conversion on the brightness data of each row of sub-pixels to obtain the second frequency component corresponding to each row of sub-pixels. The second frequency component corresponding to each row of sub-pixels may be further divided into the third sub-frequency component and the fourth sub-frequency component. For example, the second frequency component corresponding to the first row of sub-pixels may be divided into the third sub-frequency component and the fourth sub-frequency component of the first row of sub-pixels. The same applies to the second frequency component corresponding to the second row of sub-pixels, and so on.

Correspondingly, step S204 of replacing the third sub-frequency component with the first sub-frequency component may include the following step.

Replace the third sub-frequency component of multiple rows of sub-pixels with the first sub-frequency component.

Furthermore, based on the restoration of the first sub-frequency component and the fourth sub-frequency component, the third brightness data of the second color image is obtained. This process may include the following step.

Obtain the third brightness data corresponding to each row of sub-pixels based on the restoration of the first sub-frequency component and the fourth sub-frequency component.

Correspondingly, step S205 of obtaining the first compensation data based on the third brightness data may include the following step.

Obtain the first compensation data for each row of sub-pixels based on the third brightness data corresponding to each row of sub-pixels.

In this way, by calculating the average brightness of multiple rows of sub-pixels when the first color image is displayed on the display panel, a unified first sub-frequency component is obtained. Then, the unified first sub-frequency component is used to replace the third sub-frequency component of multiple rows of sub-pixels or even all rows of sub-pixels when the second color image is displayed on the display panel. On one hand, this reduces the computational load and improves the efficiency of determining the first compensation data, as there is no need to perform spatial domain to frequency domain conversion of the first brightness data for each region or each row of sub-pixels. On the other hand, since the first brightness data is the average value of the brightness data of at least one row of sub-pixels when the first color image is displayed on the display panel, the resulting first frequency component may better reflect the overall brightness distribution pattern of the first color image. This allows for more accurate compensation for the brightness distribution pattern of the first color image and better compensation for or offset of the load characteristics difference or brightness-changing pattern difference of the second color image, thereby improving the compensation effect of demura.

Figure 8:
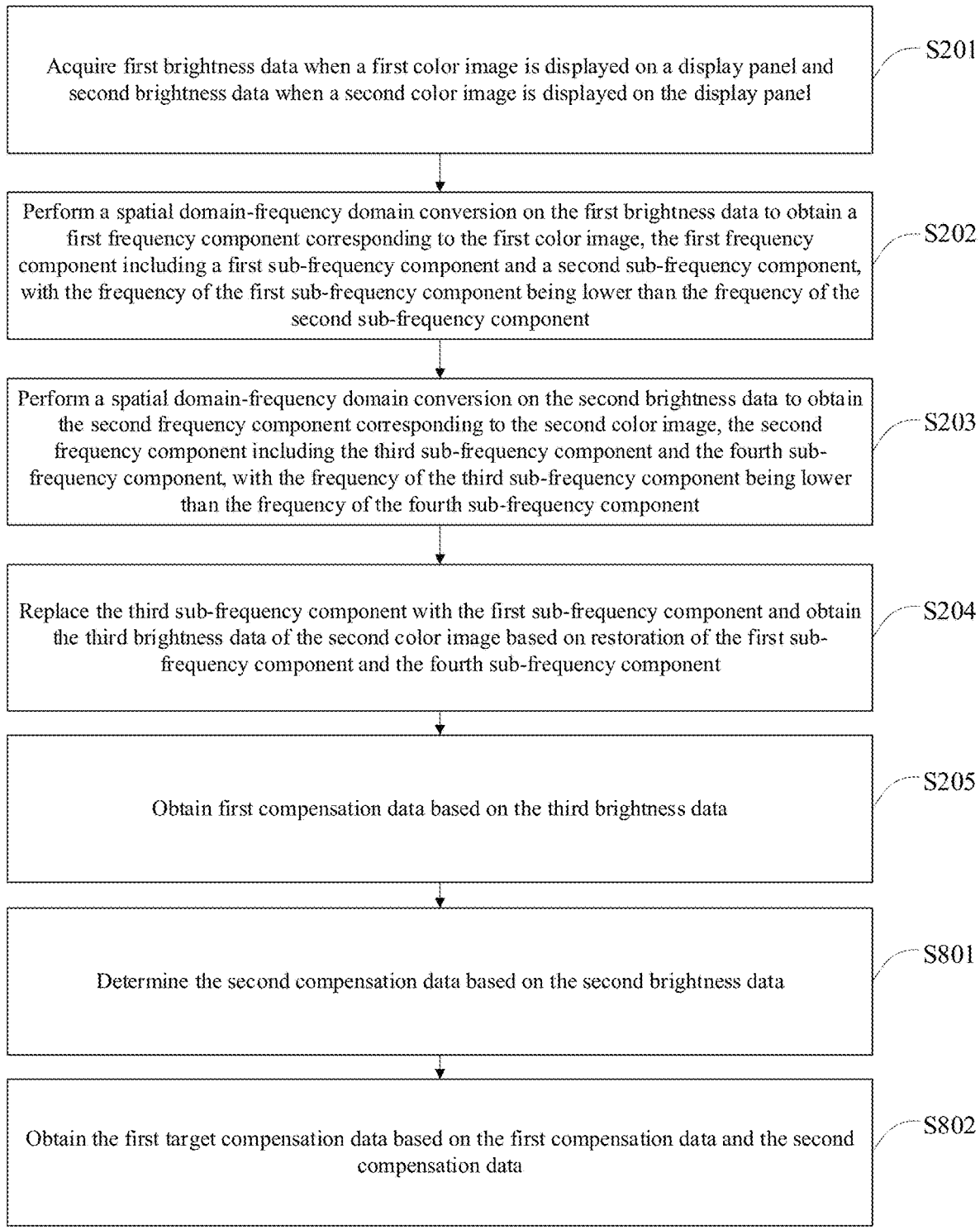
FIG. 8 is a flowchart of another compensation data determination method according to some embodiments of the disclosure.

FIG. 8 shows a flowchart of another compensation data determination method according to some embodiments of the disclosure. Optionally, the method for determining the compensation data may further include steps S801 and S802.

S801: Determine the second compensation data based on the second brightness data.

In S801, the compensation may be performed based on the original second brightness data of the second color image, resulting in the second compensation data.

In some embodiments, the display panel may include multiple regions, with each region including at least one sub-pixel. In S801, the second compensation data for each region may be obtained based on the second brightness data of the respective regions when the second color image is displayed on the display panel.

S802: Obtain the first target compensation data based on the first compensation data and the second compensation data.

The second compensation data corresponds to the compensation data when the load is heavy, while the first compensation data corresponds to the compensation data when the load is light. In the actual display of the display panel, there may also be situations between heavy and light loads. Therefore, in some embodiments, for situations between heavy and light loads, the first target compensation data may be obtained by combining the first compensation data and the second compensation data, where the first target compensation data may be used to compensate for mura.

In some embodiments, the display panel may include multiple regions, with each region including at least one sub-pixel. For any region, the first target compensation data for that region may be obtained based on the first compensation data and the second compensation data of that region.

Figure 9:
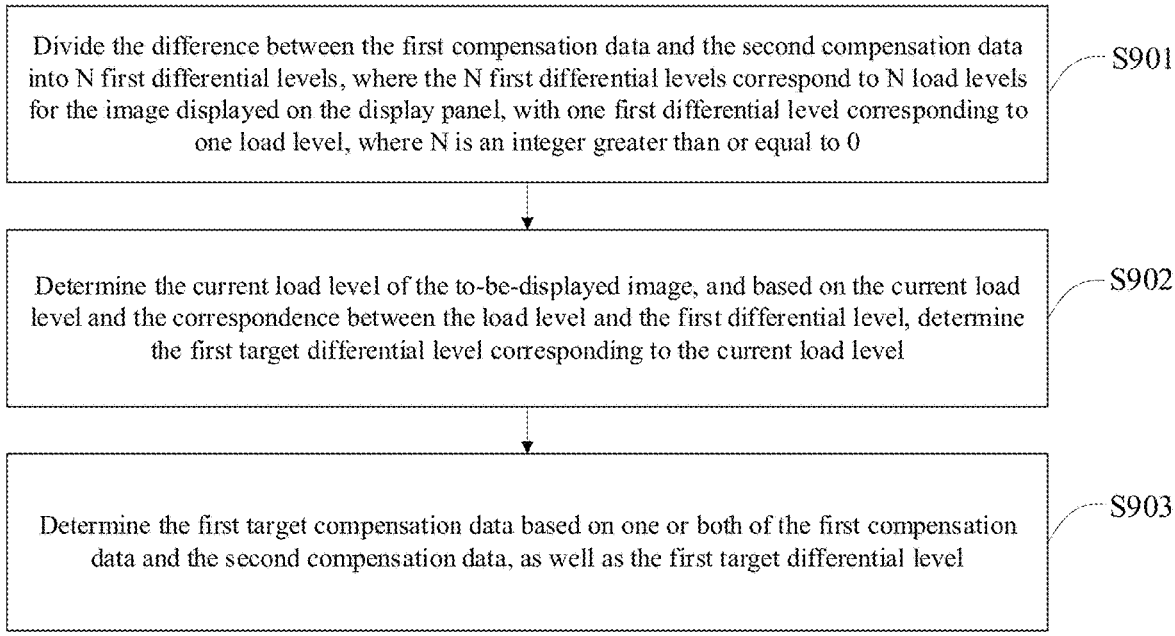
FIG. 9 is a flowchart of a method for performing step S802 in the compensation data determination method according to some embodiments of the disclosure.

FIG. 9 is a flowchart of a method for step S802 in the compensation data determination method according to some embodiments of the disclosure. Optionally, in accordance with some embodiments of this disclosure, step S802 of obtaining the first target compensation data based on the first compensation data and the second compensation data may specifically include the following steps S901-S903.

S901: Divide the difference between the first compensation data and the second compensation data into N first differential levels, where the N first differential levels correspond to N load levels for the image displayed on the display panel, with one first differential level corresponding to one load level, where N is an integer greater than or equal to 0.

For example, using offset_a to represent the first compensation data and offset_b to represent the second compensation data, the difference between offset_a and offset_b, i.e., (offset_a−offset_b), may be divided into N different first differential levels, such as $0*(\text{offset\_b}-\text{offset\_a})/N$, $1*(\text{offset\_b}-\text{offset\_a})/N$, $2*(\text{offset\_b}-\text{offset\_a})/N$, $3*(\text{offset\_b}-\text{offset\_a})/N$, . . . , $N*(\text{offset\_b}-\text{offset\_a})/N$. The N first differential levels may correspond to N load levels for the image displayed on the display panel. Specifically, each first differential level corresponds to one load level. For example, the 0-th load level corresponds to the 0-th first differential level $0*(\text{offset\_b}-\text{offset\_a})/N$, the 1st load level corresponds to the 1st first differential level $1*(\text{offset\_b}-\text{offset\_a})/N$, the 2nd load level corresponds to the 2nd first differential level $2*(\text{offset\_b}-\text{offset\_a})/N$, . . . , and the N-th load level corresponds to the N-th first differential level $N*(\text{offset\_b}-\text{offset\_a})/N$.

S902: Determine the current load level of the to-be-displayed image, and based on the current load level and the correspondence between the load level and the first differential level, determine the first target differential level corresponding to the current load level.

The load level may vary when displaying different images on the display panel. In S902, it is possible to determine the current load level of the display panel for the to-be-displayed image. Since the correspondence between the load level and the first differential level is known, it is possible to determine the first target differential level corresponding to the current load level based on the current load level and the correspondence between the load level and the first differential level. The first target differential level refers to the first differential level corresponding to the current load level.

For example, when the current load level is the first load level, the first target differential level may be $1*(\text{offset\_b}-\text{offset\_a})/N$. When the current load level is the second load level, the first target differential level may be $2*(\text{offset\_b}-\text{offset\_a})/N$.

S903: Determine the first target compensation data based on one or both of the first compensation data and the second compensation data, as well as the first target differential level.

In some embodiments, the first target compensation data may be calculated based on the following equation (1):

$$\text{offset}=\text{offset\_}a+\delta*(\text{offset\_}b-\text{offset\_}a)/N \qquad (1)$$

where offset represents the first target compensation data, offset_a represents the first compensation data, offset_b represents the second compensation data, and $\delta*(\text{offset\_}b-\text{offset\_}a)/N$ represents the first target differential level, where $0 \leq \delta \leq N$.

By adding the first target differential level to the first compensation data offset_a, the first target compensation data corresponding to the current load level may be obtained. The first target compensation data may be used to compensate for the to-be-displayed image.

In some embodiments, the first target compensation data may be calculated based on the following expression (2):

$$\text{offset}=\text{offset\_}b-\delta*(\text{offset\_}b-\text{offset\_}a)/N \qquad (2)$$

where offset represents the first target compensation data, offset_a represents the first compensation data, offset_b represents the second compensation data, and δ*(offset_b−offset_a)/N represents the first target differential level, where 0≤δ≤N.

By deducting the first target differential level from the second compensation data offset_b, the first target compensation data corresponding to the current load level may be obtained. Using the first target compensation data, compensation for the to-be-displayed image may be achieved.

Accordingly, in the actual display process, there may be various images with different loads. The difference between the first compensation data and the second compensation data may be divided into N first differential levels. The target compensation data corresponding to the current load level of the to-be-displayed image may be matched based on the current load level of the to-be-displayed image. Fine compensation may be thus achieved, thereby effectively ameliorating the problem of large deviation in compensation data.

In some embodiments, the load levels optionally include levels divided according to the average picture level (APL).

Figure 10:
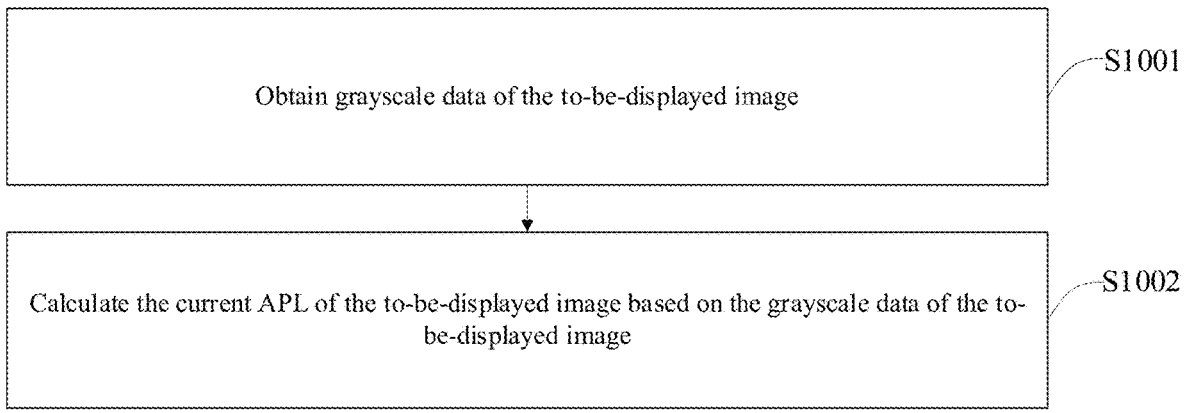
FIG. 10 is a flowchart of a method for performing step S902 in the compensation data determination method according to some embodiments of the disclosure.

FIG. 10 is a flowchart illustrating a method for step S902 in determining compensation data according to some embodiments of the present disclosure. As shown in FIG. 10, step S902 of determining the current load level of the to-be-displayed image specifically includes the following steps S1001 and S1002.

S1001: Obtain grayscale data of the to-be-displayed image.

Here, the grayscale data of the to-be-displayed image may include the to-be-displayed grayscale of each sub-pixel. The to-be-displayed grayscale of each sub-pixel is generally known.

S1002: Calculate the current APL of the to-be-displayed image based on the grayscale data of the to-be-displayed image.

The present disclosure does not limit the method of calculating APL. According to some embodiments of the disclosure, the current APL of the to-be-displayed image may be calculated based on the following expression:

$$APL = APL_R \times AK_R + APL_G \times AK_G + APL_B \times AK_B \quad (3)$$

$$APL_R = \frac{1}{VH} \sum_{k=1}^{V} \sum_{i=1}^{H} (R_{ik}) \quad (4)$$

$$APL_G = \frac{1}{VH} \sum_{k=1}^{V} \sum_{i=1}^{H} (G_{ik}) \quad (5)$$

$$APL_B = \frac{1}{VH} \sum_{k=1}^{V} \sum_{i=1}^{H} (B_{ik}) \quad (6)$$

where APL represents the current APL of the to-be-displayed image, $AK_R$, $AK_G$, and $AK_B$ respectively represent the coefficient corresponding to $APL_R$, $APL_G$, and $APL_B$, which may be flexibly set in advance according to actual conditions, V and H represent the number of pixels in the row direction and column direction of the to-be-displayed image, respectively. $R_{ik}$ represents the grayscale of the red sub-pixel in the k-th row and i-th column in the to-be-displayed image, which may be represented using preset bit data, $G_{ik}$ represents the grayscale of the green sub-pixel in the k-th row and i-th column in the to-be-displayed image, which may be represented using preset bit data, and Bik represents the grayscale of the blue sub-pixel in the k-th row and i-th column in the to-be-displayed image, which may be represented using preset bit data.

Accordingly, step S902 of determining the first target differential level corresponding to the current load level of the to-be-displayed image based on the current load level of the to-be-displayed image and the correspondence between the load level and the first differential level specifically includes the following step.

Determine the first target differential level corresponding to the current APL of the to-be-displayed image based on the current APL and the correspondence between the APL and the first differential level.

In other words, the correspondence between the APL and the first differential level may be pre-determined. N first differential levels may correspond to N APLs, where one first differential level corresponds to one APL. For example, the 0-th APL corresponds to the 0-th first differential level (0*(offset_b−offset_a)/N), the 1st APL corresponds to the 1st first differential level (1*(offset_b−offset_a)/N), the 2nd APL corresponds to the 2nd first differential level (2*(offset_b−offset_a)/N), . . . , and the N-th APL corresponds to the N-th first differential level (N*(offset_b−offset_a)/N).

After determining the current APL of the to-be-displayed image, the first target differential level corresponding to the current APL may be determined based on the current APL of the to-be-displayed image and the correspondence between the current APL and the first differential level.

In this way, based on the APL, the difference between the first compensation data and the second compensation data is divided into N first differential levels. Based on the current APL of the to-be-displayed image, the target compensation data corresponding to the current APL may be matched. This may realize fine compensation, thereby effectively ameliorating the problem of large deviation in compensation data.

According to some embodiments of the present disclosure, the load level may optionally include levels divided based on the proportion of sub-pixels emitting a target color in the displayed image. For example, when there is a greater proportion of sub-pixels emitting red and/or blue colors in an image, the load level of the image is heavier. On the other hand, when there is a smaller proportion of sub-pixels emitting red and/or blue colors in an image, the load level of the image is lighter. Therefore, different load levels may be determined based on the proportion of sub-pixels emitting the target color(s) in an image.

Figure 11:
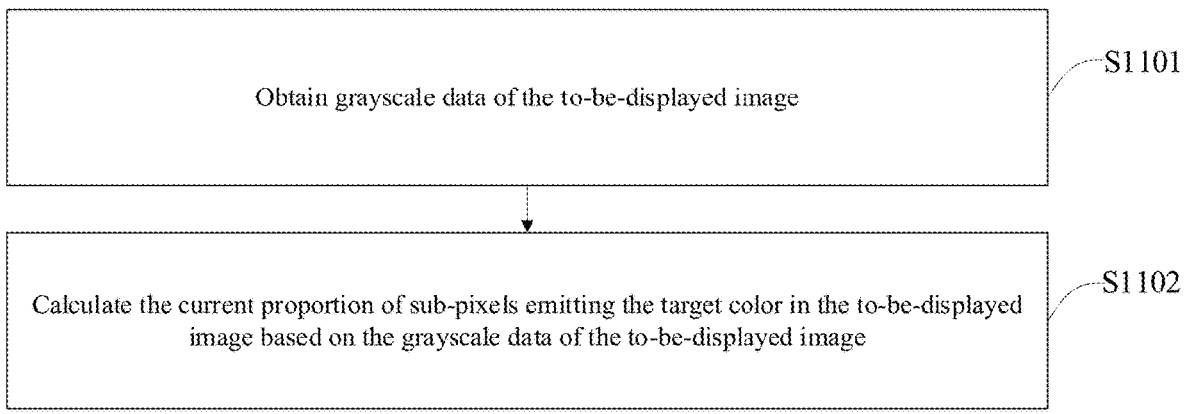
FIG. 11 is a flowchart of another method for performing step S902 in the compensation data determination method according to some embodiments of the disclosure.

FIG. 11 is a flowchart illustrating another method for step S902 in determining compensation data according to some embodiments of the present disclosure. As shown in FIG. 11, step S902 of determining the current load level of the to-be-displayed image may specifically include the following steps S1101 and S1102.

S1101: Obtain grayscale data of the to-be-displayed image.

The grayscale data of the to-be-displayed image may include the to-be-displayed grayscale of each sub-pixel. The to-be-displayed grayscale of each sub-pixel is generally known.

S1102: Calculate the current proportion of sub-pixels emitting the target color in the to-be-displayed image based on the grayscale data of the to-be-displayed image.

Since the to-be-displayed grayscale of each sub-pixel is known, the number of sub-pixels emitting the target color may be determined. For example, when the to-be-displayed grayscale of sub-pixels emitting the target color is greater than a preset grayscale threshold value, it is determined that the sub-pixels are emitting light the target color. Therefore, the number of sub-pixels emitting the target color and having the to-be-displayed grayscale greater than the preset grayscale threshold may be obtained. The preset grayscale threshold may be flexibly adjusted according to the actual situation, which is not limited in the present disclosure.

After obtaining the number of sub-pixels emitting the target color in a to-be-displayed image, the current proportion of the sub-pixels emitting the target color in the to-be-displayed image may be calculated by dividing the total number of sub-pixels in the to-be-displayed image by the number of sub-pixels emitting the target color.

Accordingly, step S902 of determining the first target differential level corresponding to the current load level based on the current load level of the to-be-displayed image and correspondence between the load level and the first differential level may include the following step.

Determine the first target differential level corresponding to the current proportion of sub-pixels emitting the target color in the to-be-displayed image based on the current proportion of sub-pixels emitting the target color in the to-be-displayed image and the correspondence between the proportion of sub-pixels emitting the target color and the first differential level.

The specific implementation process is similar to the process of determining the first target differential level based on the current APL, as described above, details of which will not be reiterated here.

Accordingly, based on the proportion of sub-pixels emitting the target color in the to-be-displayed image, the difference between the first compensation data and the second compensation data may be divided into N first differential levels. Based on the current proportion of sub-pixels emitting the target color in the to-be-displayed image, the target compensation data corresponding to the current proportion of sub-pixels emitting the target color in the to-be-displayed image may be matched. Fine compensation may be achieved, thereby ameliorating the problem of large deviation in compensation data.

In some embodiments, optionally, the sub-pixels of the target color (i.e., sub-pixels emitting the target color) may include at least one type of red sub-pixels and blue sub-pixels.

As described above, when the proportion of sub-pixels emitting red and/or blue color in an image is higher, the load level of the image is heavier. When the proportion of sub-pixels emitting red and/or blue color in an image is lower, the load level of the image is lighter. Accordingly, based on the proportion of sub-pixels emitting red and/or blue colors, different load levels may be accurately determined, which also better reflects the load level of the to-be-displayed image.

In some embodiments, optionally, the sub-pixels of the target color may include green sub-pixels.

Unlike red sub-pixels and/or blue sub-pixels, when the proportion of sub-pixels emitting green color in an image is high, the load level of the image is lighter. When the proportion of sub-pixels emitting green color in an image is low, the load level of the image is heavier. Accordingly, based on the proportion of sub-pixels emitting green color, different load levels may be also accurately determined, which better reflects the load level of the to-be-displayed image.

According to some embodiments of this disclosure, optionally, the third brightness data may include brightness values of multiple sub-pixels of the display panel.

Correspondingly, step S205 of obtaining the first compensation data based on the third brightness data may include the following step.

For any sub-pixel, when the brightness difference between the sub-pixel's brightness value and the reference brightness value is greater than a first preset threshold, the grayscale difference corresponding to the sub-pixel is determined based on the brightness difference between the sub-pixel's brightness value and the reference brightness value, as well as the correspondence between the brightness difference and the grayscale difference. The first compensation data includes the grayscale difference corresponding to at least one sub-pixel.

Specifically, the correspondence between the brightness difference and the grayscale difference corresponding to the second color sub-pixel may be determined in advance. For example, when the brightness difference is $\Delta L1$, the corresponding grayscale difference is $\Delta h1$, when the brightness difference is $\Delta L2$, the corresponding grayscale difference is $\Delta h2$, . . . , when the brightness difference is $\Delta Ln$, the corresponding grayscale difference is $\Delta hn$, where n is a positive integer. $\Delta L1$ to $\Delta Ln$ may be positive or negative, and $\Delta h1$ to $\Delta hn$ may be positive or negative, which is not limited in the present disclosure.

The reference brightness value and the first preset threshold may be flexibly adjusted according to the actual situation, which is not limited in the present disclosure. The reference brightness values corresponding to different grayscales may be different, and the first preset threshold corresponding to different grayscales may be the same or different.

Accordingly, based on the brightness difference between the brightness value of each second color sub-pixel and the reference brightness value, and the correspondence between the brightness difference and the grayscale difference of the second color sub-pixels (i.e., sub-pixels emitting the second color), the grayscale difference corresponding to each second color sub-pixel may be determined, thereby obtaining the first compensation data and achieving compensation for mura.

It should be noted that the second compensation data may also be obtained in a similar manner as the first compensation data, details of which will not be described here.

As mentioned above, the red monochrome image and the blue monochrome image both exhibit heavy load characteristics. Therefore, in addition to compensating for the heavy load characteristics (or brightness distribution pattern) of one of the red monochrome image and the blue monochrome image, compensation may also be performed for the heavy load characteristics (or brightness distribution pattern) of the other image.

Figure 12:
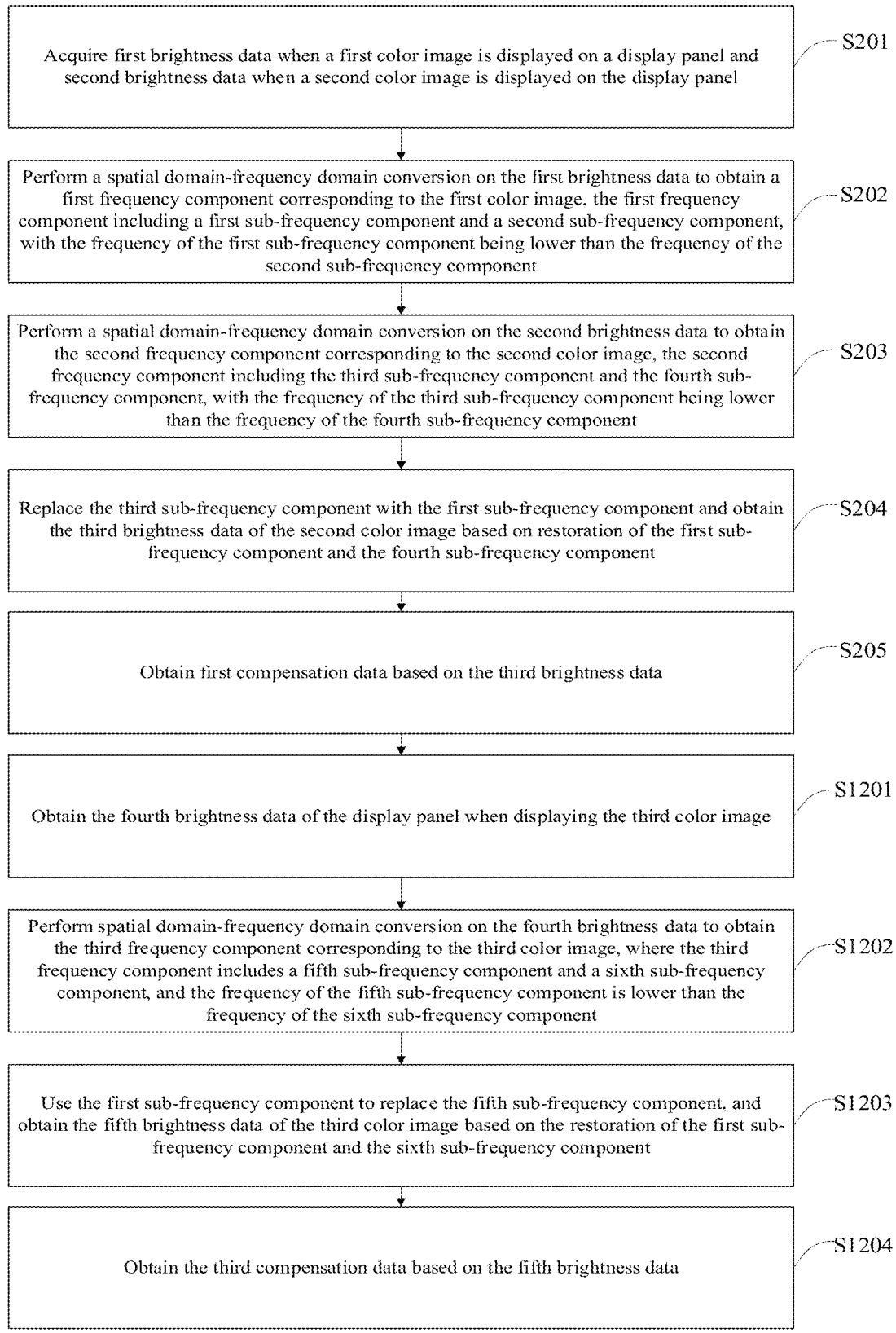
FIG. 12 is a flowchart of yet another compensation data determination method according to some embodiments of the disclosure.

FIG. 12 is another flowchart illustrating a compensation data determination method according to some embodiments of the disclosure. As shown in FIG. 12, according to some embodiments of this disclosure, optionally, the compensation data determination method may further include the following steps S1201-S1204.

S1201: Obtain the fourth brightness data of the display panel when displaying the third color image.

S1202: Perform spatial domain-frequency domain conversion on the fourth brightness data to obtain the third frequency component corresponding to the third color image, where the third frequency component includes a fifth sub-frequency component and a sixth sub-frequency component, and the frequency of the fifth sub-frequency component is lower than the frequency of the sixth sub-frequency component.

S1203: Use the first sub-frequency component to replace the fifth sub-frequency component, and obtain the fifth brightness data of the third color image based on the restoration of the first sub-frequency component and the sixth sub-frequency component.

S1204: Obtain the third compensation data based on the fifth brightness data.

The specific implementation processes of steps S1201-S1204 are similar to the specific implementation processes of steps S201 and S203-S205 mentioned above, details of which may refer to the previous descriptions.

According to the above descriptions, the method for determining the compensation data in the present disclosure utilizes the first sub-frequency component of the first color image to replace the fifth sub-frequency component of the third color image. Based on the restoration of the first sub-frequency component and the sixth sub-frequency component, the fifth brightness data of the third color image is obtained. This may transform the load characteristics (or brightness distribution pattern) of the third color image to be the same or similar to the load characteristics (or brightness distribution pattern) of the image used for validating the compensation effect. The process compensates for or at least partially offsets the load characteristic difference or brightness-changing pattern difference of the third color image. That is, the process not only compensates for the load characteristic difference or brightness-changing pattern difference of the second color image, but also achieves compensation for the load characteristic difference or brightness-changing pattern difference of the third color image. Thus, it significantly ameliorates the inaccuracy problem of the determined compensation data caused by different load characteristics (brightness distribution pattern), thereby enhancing the compensation effect of demura.

Figure 13:
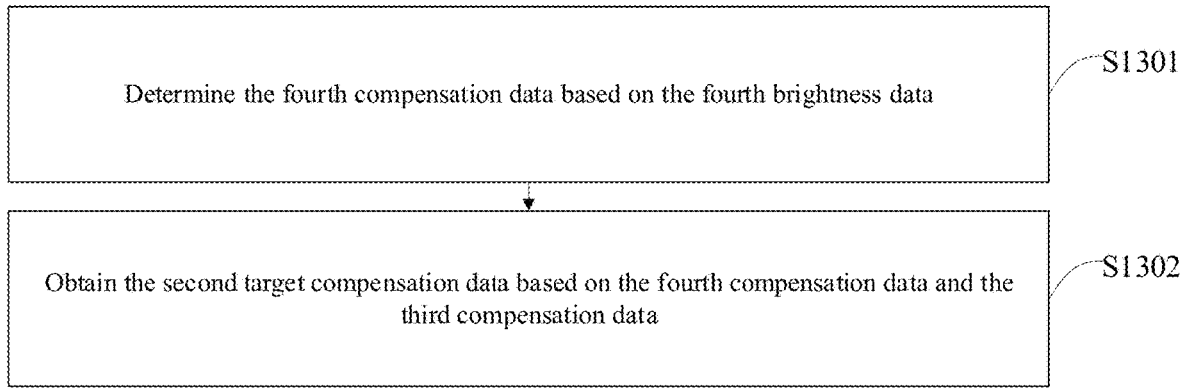
FIG. 13 is a flowchart of yet another compensation data determination method according to some embodiments of the disclosure.

FIG. 13 is a flowchart of another method for determining the compensation data according to some embodiments of the present disclosure. As shown in FIG. 13, according to some embodiments, optionally, the method for determining the compensation data may further include steps S1301 to S1302.

S1301: Determine the fourth compensation data based on the fourth brightness data.

In step S1301, compensation may be performed based on the original fourth brightness data of the third color image to obtain the fourth compensation data.

In some embodiments, the display panel may include multiple regions, and a region may include at least one sub-pixel. In step S1301, based on the fourth brightness data of each region when the third color image is displayed on the display panel, the fourth compensation data of each region may be obtained.

S1302: Obtain the second target compensation data based on the fourth compensation data and the third compensation data.

The fourth compensation data may mean the compensation data under heavy load, and the third compensation data may mean the compensation data under light load. When the display panel displays actual images, there may be cases between heavy load and light load. Therefore, in some embodiments, for cases between heavy load and light load, the second target compensation data may be obtained by combining the third compensation data and the fourth compensation data. The second target compensation data may be used to compensate for mura.

In some embodiments, a display panel may include multiple regions, and each region may include at least one row of sub-pixels. For any given region, the second target compensation data for that region may be obtained based on the third compensation data and the fourth compensation data of that region.

Figure 14:
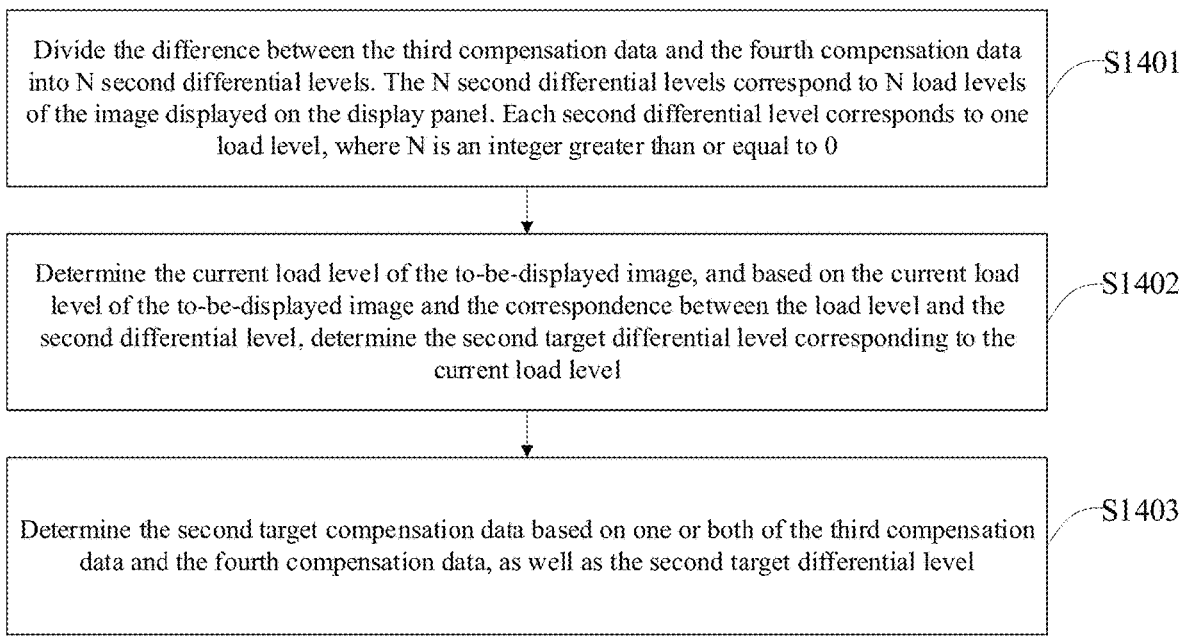
FIG. 14 is a flowchart of a method for performing step S1302 in the compensation data determination method according to some embodiments of the disclosure.

FIG. 14 is a flowchart of a method for step S1302 in determining compensation data according to some embodiments of the disclosure. As shown in FIG. 14, according to some embodiments of this disclosure, optionally, step S1302 may include the following steps S1401-S1403.

S1401: Divide the difference between the third compensation data and the fourth compensation data into N second differential levels. The N second differential levels correspond to N load levels of the image displayed on the display panel. Each second differential level corresponds to one load level, where N is an integer greater than or equal to 0.

S1402: Determine the current load level of the to-be-displayed image, and based on the current load level of the to-be-displayed image and the correspondence between the load level and the second differential level, determine the second target differential level corresponding to the current load level.

S1403: Determine the second target compensation data based on one or both of the third compensation data and the fourth compensation data, as well as the second target differential level.

The specific implementation processes of steps S1401-S1403 are similar to the specific implementation processes of steps S901-S903 described above, details of which may refer to the previous descriptions.

During the actual display processes, there may be multiple images with different loads. The difference between the third compensation data and the fourth compensation data may be divided into N second differential levels. Based on the current load level of the to-be-displayed image, the target compensation data corresponding to the current load level may be matched. Fine compensation may be achieved, thereby ameliorating the problem of large deviation in compensation data.

It should be noted that embodiments described above regarding the second color image are also applicable to the third color image. For the sake of brevity, relevant details are not described again here.

According to some embodiments of this disclosure, optionally, the spatial domain-frequency domain conversion (also referred to as time domain-frequency domain conversion) adopted in this disclosure includes but is not limited to the Fourier transform.

Fourier transform has advantages such as high efficiency, high accuracy, and ease of implementation. For example, Fourier transform may process a large amount of data in a short period of time while still maintaining high accuracy.

Based on a similar technical concept to the methods for determining compensation data provided in the above embodiments, the present disclosure also provides a brightness compensation method. The brightness compensation method may include the various steps provided in the compensation data determination methods described in the above embodiments.

Figure 15:
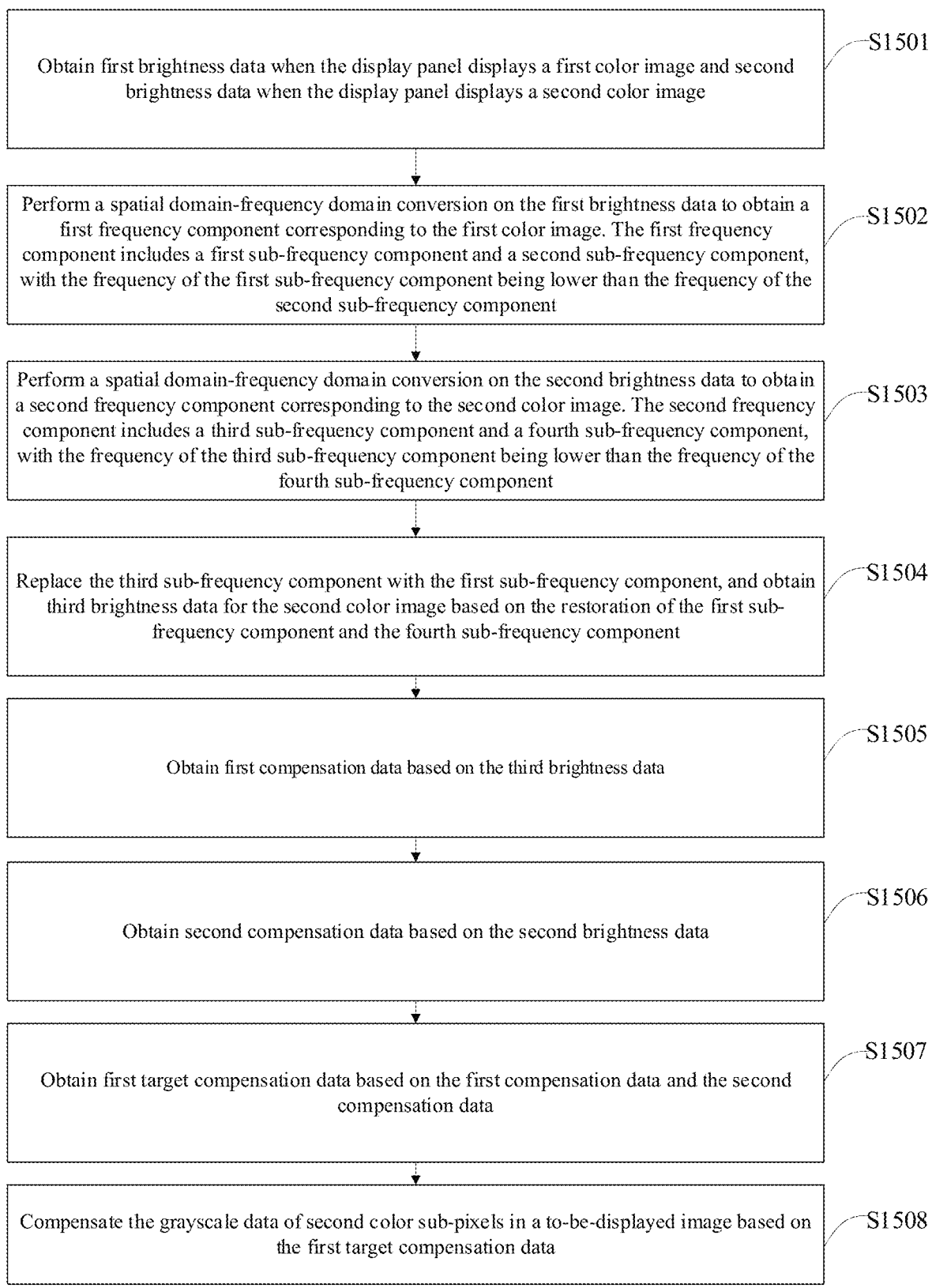
FIG. 15 is a flowchart of a brightness compensation method according to some embodiments of the disclosure.

FIG. 15 is a flowchart illustrating a method of brightness compensation according to some embodiments of the present disclosure. As shown in FIG. 15, the brightness compensation method may include the following steps.

S1501: Obtain first brightness data when the display panel displays a first color image and second brightness data when the display panel displays a second color image.

S1502: Perform a spatial domain-frequency domain conversion on the first brightness data to obtain a first frequency component corresponding to the first color image. The first frequency component includes a first sub-frequency component and a second sub-frequency component, with the frequency of the first sub-frequency component being lower than the frequency of the second sub-frequency component.

S1503: Perform a spatial domain-frequency domain conversion on the second brightness data to obtain a second frequency component corresponding to the second color image. The second frequency component includes a third sub-frequency component and a fourth sub-frequency component, with the frequency of the third sub-frequency component being lower than the frequency of the fourth sub-frequency component.

S1504: Replace the third sub-frequency component with the first sub-frequency component, and obtain third brightness data for the second color image based on the restoration of the first sub-frequency component and the fourth sub-frequency component.

S1505: Obtain first compensation data based on the third brightness data.

S1506: Obtain second compensation data based on the second brightness data.

S1507: Obtain first target compensation data based on the first compensation data and the second compensation data.

S1508: Compensate the grayscale data of second color sub-pixels in a to-be-displayed image based on the first target compensation data.

The specific implementations of the above steps S1501-S1507 may refer to the descriptions of steps S201-S205, S801, and S802 in the compensation data determination methods in the above embodiments, details of which will not be reiterated here.

In S1508, after obtaining the first target compensation data, the grayscale data of the second color sub-pixels in the to-be-displayed image may be compensated using the first target compensation data. For example, in some embodiments, the first target compensation data may include grayscale difference values corresponding to multiple second color sub-pixels. By calculating the sums of the respective grayscale difference values corresponding to multiple second color sub-pixels and the respective grayscale data of the multiple second color sub-pixels in the to-be-displayed image, the compensated grayscale data of the second color sub-pixels in the to-be-displayed image may be obtained, thereby achieving the compensation.

The brightness compensation method of the present disclosure utilizes the first sub-frequency component of the first color image to replace the third sub-frequency component of the second color image, and based on the restoration of the first sub-frequency component and the fourth sub-frequency component, the third brightness data of the second color image is obtained. This may transform the load characteristics (or brightness distribution pattern) of the second color image to be the same as or similar to the load characteristics (or brightness distribution pattern) of the image used for validating the compensation effect. The process compensates for or at least partially offsets the difference in load characteristics or difference in the brightness-changing pattern of the second color image. This effectively ameliorates the inaccuracy of the determined compensation data caused by different load characteristics (or brightness distribution pattern), thereby enhancing the compensation effect of demura.

Figure 16:
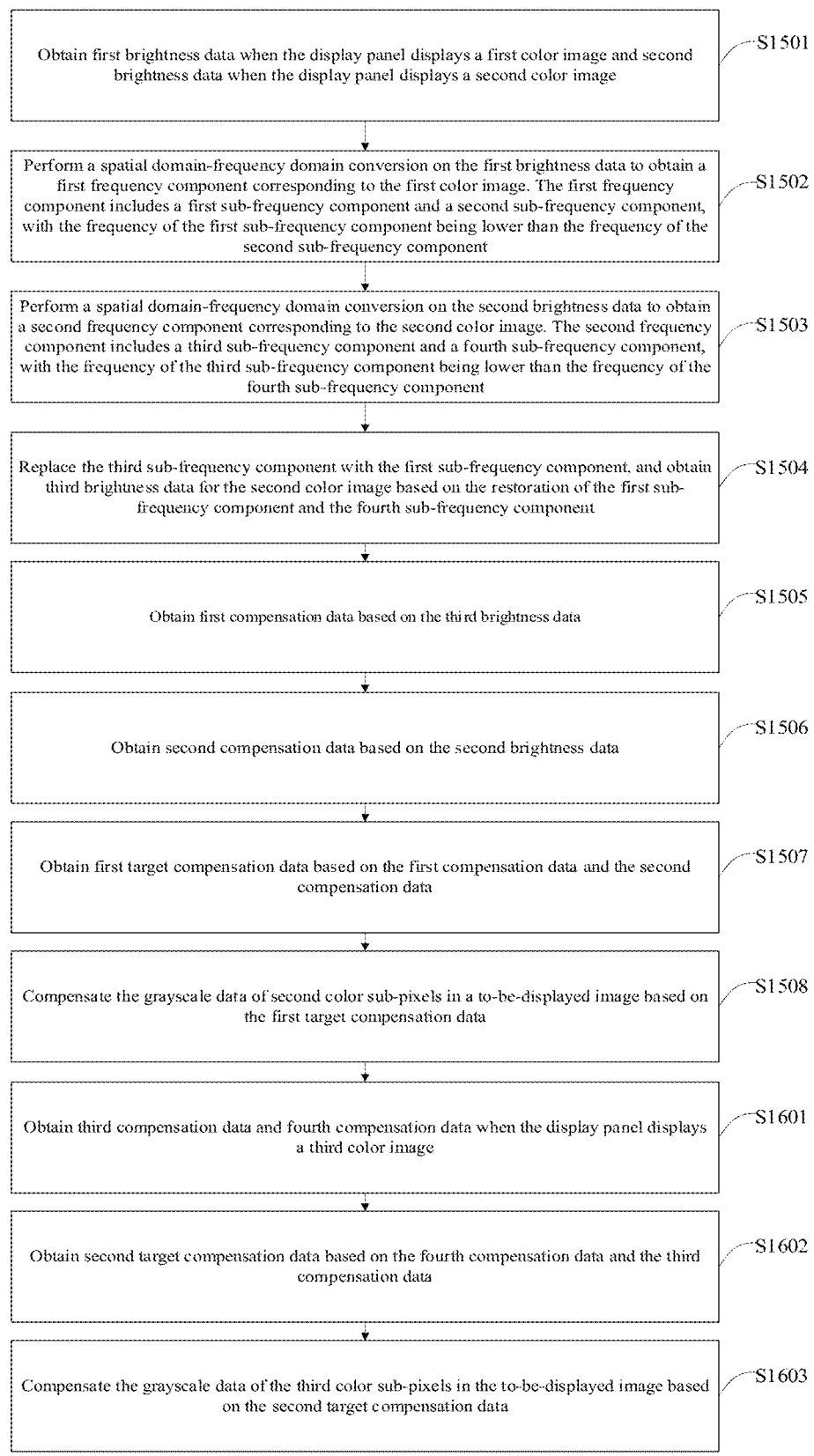
FIG. 16 is a flowchart of another brightness compensation method according to some embodiments of the disclosure.

FIG. 16 is a flowchart of another method for brightness compensation according to some embodiments of the present disclosure. As shown in FIG. 16, according to some embodiments of the present disclosure, optionally, the brightness compensation method may further include the following steps S1601-S1603.

S1601: Obtain third compensation data and fourth compensation data when the display panel displays a third color image.

Here, obtaining the third compensation data when the display panel displays the third color image may specifically include the following steps.

Step 1: Obtain fourth brightness data when the display panel displays the third color image on the display panel.

Step 2: Perform a spatial domain-frequency domain conversion on the fourth brightness data to obtain a third frequency component corresponding to the third color image. The third frequency component includes a fifth sub-frequency component and a sixth sub-frequency component, with the frequency of the fifth sub-frequency component being lower than the frequency of the sixth sub-frequency component.

Step 3: Replace the fifth sub-frequency component with the first sub-frequency component, and obtain the fifth brightness data for the third color image based on the restoration of the first sub-frequency component and the sixth sub-frequency component.

Step 4: Obtain the third compensation data based on the fifth brightness data.

The specific implementations of the above steps 1 to 4 may refer to the descriptions of steps S1201-S1204 in the compensation data determination methods provided in the above embodiments, details of which will not be reiterated here.

Similarly, obtaining the fourth compensation data when the display panel displays the third color image may specifically include the following steps.

Step 5: Determine the fourth compensation data based on the fourth brightness data.

The specific implementation of step 5 may refer to the description of step S1301 in the compensation data determination method provided in the above embodiments, details of which will not be reiterated here.

S1602: Obtain second target compensation data based on the fourth compensation data and the third compensation data.

S1603: Compensate the grayscale data of the third color sub-pixels in the to-be-displayed image based on the second target compensation data.

In step S1603, after obtaining the second target compensation data, the grayscale data of the third color sub-pixels (i.e., sub-pixels emitting the third color) in the displayed image may be compensated using the second target compensation data. For example, in some embodiments, the second target compensation data may include grayscale differences corresponding to multiple third color sub-pixels. By calculating the sums of the respective grayscale difference values corresponding to multiple third color sub-pixels and the respective grayscale data corresponding to the multiple third color sub-pixels in the to-be-displayed image, the compensated grayscale data of the third color sub-pixels in the to-be-displayed image may be obtained, thus achieving the demura compensation.

In light of the above, the brightness compensation methods in the above embodiments of the present disclosure use the first sub-frequency component of the first color image to replace the fifth sub-frequency component of the third color image, and based on the restoration of the first sub-frequency component and the sixth sub-frequency component, the fifth brightness data of the third color image is obtained. This may transform the load characteristic (or brightness distribution pattern) of the third color image to be the same or similar to the load characteristic (or brightness distribution pattern) of the image used to validate the compensation effect, thereby compensating for or at least partially offsetting the load characteristic difference or brightness-changing pattern difference of the third color image. This process not only compensates for the load characteristic difference or brightness-changing pattern difference of the second color image but also compensates for the load characteristic difference or brightness-changing pattern difference of the third color image, thereby greatly ameliorating the inaccurate determination of the compensation data caused by different load characteristics (or brightness distribution pattern), and enhancing the compensation effect of demura.

Based on the similar technical concept as the compensation data determination methods provided in the above embodiments, the present disclosure further provides a compensation data determination device.

Figure 17:
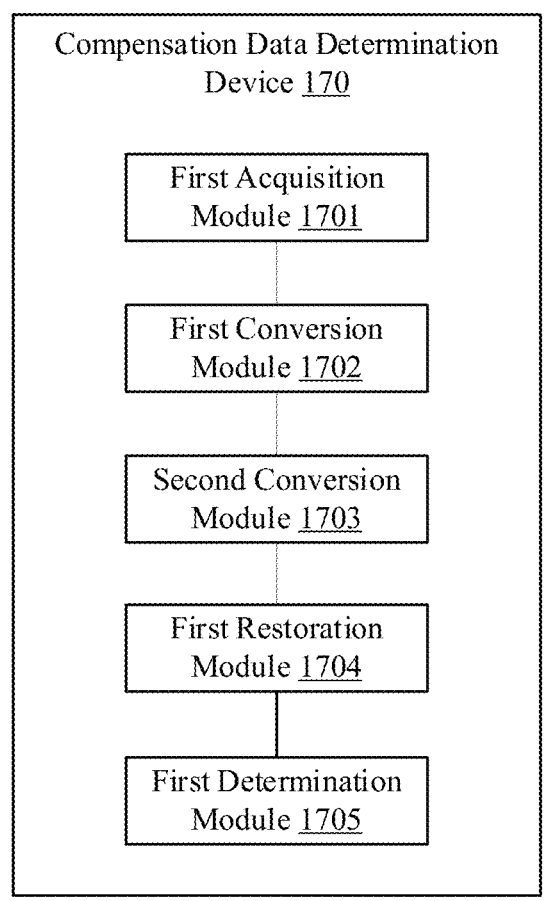
FIG. 17 is a schematic diagram illustrating the architecture of a compensation data determination device according to some embodiments of the disclosure.

FIG. 17 is a schematic diagram illustrating the architecture of a compensation data determination device according to some embodiments of the disclosure. As shown in FIG. 17, the compensation data determination device 170 provided in the present disclosure may include the following modules.

A first acquisition module 1701 is configured to obtain first brightness data when a display panel displays a first color image, and second brightness data when the display panel displays a second color image.

A first conversion module 1702 is configured to perform a spatial domain-frequency domain conversion on the first brightness data to obtain the first frequency component corresponding to the first color image, where the first frequency component includes a first sub-frequency component and a second sub-frequency component, and the frequency of the first sub-frequency component is lower than the frequency of the second sub-frequency component.

A second conversion module 1703 is configured to perform a spatial domain-frequency domain conversion on the second brightness data to obtain the second frequency component corresponding to the second color image, where the second frequency component includes a third sub-frequency component and a fourth sub-frequency component, and the frequency of the third sub-frequency component is lower than the frequency of the fourth sub-frequency component.

A first restoration module 1704 is configured to replace the third sub-frequency component of the second color image with the first sub-frequency component, and obtain third brightness data of the second color image based on the restoration of the first sub-frequency component and the fourth sub-frequency component.

A first determination module 1705 is configured to determine the first compensation data based on the third brightness data.

The compensation data determination device of the present disclosure uses the first sub-frequency component of the first color image to replace the third sub-frequency component of the second color image, and obtains the third brightness data of the second color image based on the restoration of the first sub-frequency component and the fourth sub-frequency component. This may transform the load characteristic (or brightness distribution pattern) of the second color image to be the same or similar to the load characteristic (or brightness distribution pattern) of the image used to validate the compensation effect, thereby compensating for or at least partially offsetting the load characteristic difference or brightness-changing pattern difference of the second color image. This ameliorates the problem of inaccurate determination of compensation data caused by different load characteristics (or brightness distribution pattern) and enhances the compensation effect of demura.

In some embodiments, the display panel includes multiple regions arranged in the column direction of the display panel, where a region includes at least one row of sub-pixels. The first brightness data includes the brightness data of the target region when displaying the first color image on the display panel, and the second brightness data includes the brightness data of the target region when displaying the second color image on the display panel. The target region may be any region among the multiple regions.

In some embodiments, the multiple regions include an x1-th region and an x2-th region, where x1 and x2 are positive integers, and x1/x2. The first restoration module 1704 is specifically configured to, when the target region is the x1-th region, use the first sub-frequency component corresponding to the x1-th region to replace the third sub-frequency component corresponding to the x1-th region and obtain the third brightness data corresponding to the x1-th region based on the restoration of the first sub-frequency component and the fourth sub-frequency component corresponding to the x1-th region. When the target region is the x2-th region, the first restoration module 1704 uses the first sub-frequency component corresponding to the x2-th region to replace the third sub-frequency component corresponding to the x2-th region and obtains the third brightness data corresponding to the x2-th region based on the restoration of the first sub-frequency component and the fourth sub-frequency component corresponding to the x2-th region. The first determination module 1705 is then specifically configured to determine the first compensation data corresponding to the x1-th region based on the third brightness data corresponding to the x1-th region, and determine the first compensation data corresponding to the x2-th region based on the third brightness data corresponding to the x2-th region.

In some embodiments, the display panel includes multiple regions arranged in the column direction of the display panel, where a region includes at least one row of sub-pixels. The first brightness data includes the average value of the brightness data of at least one row of sub-pixels when displaying the first color image on the display panel, and the second brightness data includes the brightness data of multiple rows of sub-pixels when displaying the second color image on the display panel. The second conversion module 1703 is configured to specifically perform a spatial domain-frequency domain conversion on the brightness data of each row of sub-pixels to obtain the second frequency component corresponding to each row of sub-pixels. The first restoration module 1704 is specifically configured to use the first sub-frequency component to replace the third sub-frequency component corresponding to each row of sub-pixels.

In some embodiments, the compensation data determination device 170 provided by the present disclosure may further include a first target compensation data determination module configured to determine second compensation data based on the second brightness data and determine first target compensation data based on the first compensation data and the second compensation data.

In some embodiments, the first target compensation data determination module is specifically configured to divide the difference between the first compensation data and the second compensation data into N first differential levels, where N first differential levels correspond to N load levels of the image displayed on the display panel, with each first differential level corresponding to one load level, and N is an integer greater than or equal to 0. The first target compensation data determination module is further configured to determine the current load level of the to-be-displayed image, and based on the current load level and the correspondence between the load level and the first differential level, determine the first target differential level corresponding to the current load level. The first target compensation data determination module is then configured to determine the first target compensation data based on one or both of the first compensation data and the second compensation data, as well as the first target differential level.

In some embodiments, the load levels include levels divided according to the APL. The first target compensation data determination module is specifically configured to obtain the grayscale data of the to-be-displayed image, calculate the current APL of the to-be-displayed image based on the grayscale data, and based on the current APL and the correspondence between the APL and the first differential level, determine the first target differential level corresponding to the current APL.

In some embodiments, the load levels include levels divided according to the proportion of sub-pixels emitting the target color in the displayed image. The first target compensation data determination module is specifically configured to obtain the grayscale data of the to-be-displayed image and, based on the grayscale data, calculate the current proportion of sub-pixels emitting the target color in the to-be-displayed image. The first target compensation data determination module is further configured to, based on the current proportion of sub-pixels emitting the target color and the correspondence between the proportion of sub-pixels emitting the target color and the first differential level, determine the first target differential level corresponding to the current proportion of sub-pixels emitting the target color in the to-be-displayed image.

In some embodiments, the sub-pixels of the target color include at least one type of red sub-pixels and blue sub-pixels, or the sub-pixels of the target color include green sub-pixels.

In some embodiments, the first target compensation data determination module is specifically configured to calculate the first target compensation data based on the following expressions:

$$\text{offset} = \text{offset}\_a + \delta * (\text{offset}\_b - \text{offset}\_a)/N, \text{ or}$$

$$\text{offset} = \text{offset}\_b - \delta * (\text{offset}\_b - \text{offset}\_a)/N$$

where offset represents the first target compensation data, offset_a represents the first compensation data, offset_b represents the second compensation data, and $\delta * (\text{offset}\_b - \text{offset}\_a)/N$ represents the first target differential level, where $0 \leq \delta \leq N$.

In some embodiments, the third brightness data includes the brightness values of multiple sub-pixels of the display panel. The first determination module 1705 is specifically configured to, for any sub-pixel, when the difference between the brightness of the sub-pixel and a reference brightness is greater than a first preset threshold, determine the grayscale difference corresponding to each sub-pixel based on the brightness difference between the sub-pixel and the reference brightness and the correspondence between the brightness difference and the grayscale difference. The first compensation data includes the grayscale difference for at least one sub-pixel.

In some embodiments, the compensation data determination device 170 provided in this disclosure may further include a third compensation data determination module.

The third compensation data determination module is configured to obtain the fourth brightness data when a third color image is displayed on the display panel. The fourth brightness data is subjected to spatial-domain to frequency domain conversion to obtain the third frequency component corresponding to the third color image. The third frequency component includes a fifth sub-frequency component and a sixth sub-frequency component, where the frequency of the fifth sub-frequency component is lower than the frequency of the sixth sub-frequency component. The fifth sub-frequency component is replaced with the first sub-frequency component, and based on the restoration of the first sub-frequency component and the sixth sub-frequency component, the fifth brightness data of the third color image is obtained. The third compensation data is obtained based on the fifth brightness data of the third color image.

In some embodiments, the compensating data determination device 170 provided by the present disclosure may further include a second target compensation data determination module configured to determine the fourth compensation data based on the fourth brightness data, and determine the second target compensation data based on the fourth compensation data and the third compensation data.

In some embodiments, the second target compensation data determination module is specifically configured to divide the difference between the third compensation data and the fourth compensation data into N second differential levels, where N second differential levels correspond to N load levels of the image displayed on the display panel, with each second differential level corresponding to one load level, and N is a positive integer. The second target compensation data determination module is further configured to determine the current load level of the to-be-displayed image, and based on the current load level of the to-be-displayed image and the correspondence between the load level and the second differential level, determine the second target differential level corresponding to the current load level. The second target compensation data determination module is further configured to determine the second target compensation data based on at least one or both of the third compensation data and the fourth compensation data, as well as the second target differential level.

In some embodiments, the spatial domain-frequency domain conversion includes Fourier transformation.

Each module or unit in the compensation data determination device shown in FIG. 17 may perform the functions of each step described in the above-described method embodiments for determining compensating data, and achieve their respective technical effects. For the sake of brevity, these steps are not reiterated here.

Based on the compensation data determination methods and compensation data determination device provided in the above embodiments, the present disclosure further provides a brightness compensation device.

Figure 18:
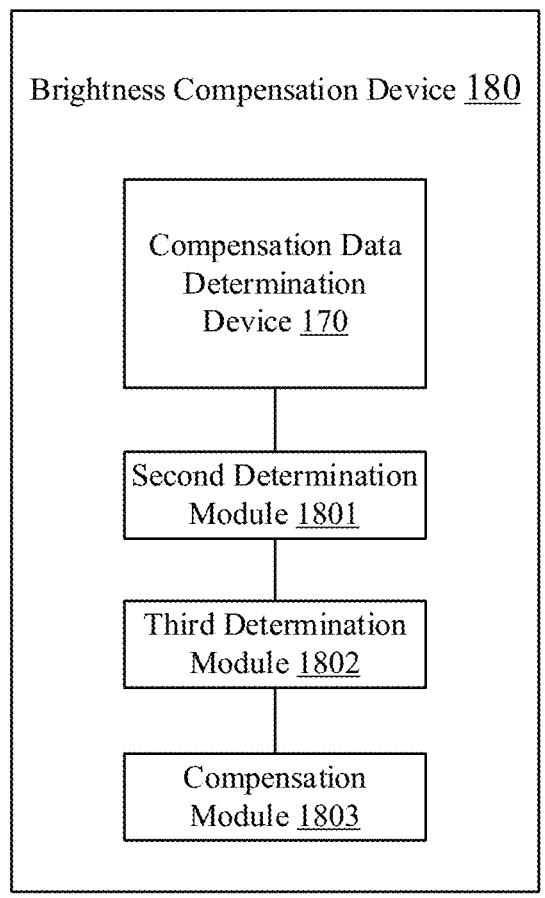
FIG. 18 is a schematic diagram illustrating the architecture of a brightness compensation device according to some embodiments of the disclosure.

FIG. 18 is a schematic diagram illustrating the architecture of the brightness compensation device according to some embodiments of the disclosure. As shown in FIG. 18, the brightness compensation device 180 provided in the present disclosure may include a compensation data determination device 170 and modules described in the following.

A second determination module 1801 is configured to determine the second compensation data based on the second brightness data.

A third determination module 1802 is configured to obtain the first target compensation data based on the first compensation data and the second compensation data.

A compensation module 1803 is configured to compensate the grayscale data of the second color sub-pixels in the to-be-displayed image based on the first target compensation data.

The brightness compensation device of the present disclosure replaces the third sub-frequency component of the second color image with the first sub-frequency component of the first color image. Based on the restoration of the first sub-frequency component and the fourth sub-frequency component, the third brightness data of the second color image is obtained. This enables the transformation of the load characteristics (or brightness distribution pattern) of the second color image to be similar or close to the load characteristics (or brightness distribution pattern) of the image used to validate the compensation effect. This compensates for or at least partially offsets the difference in load characteristics or difference in the brightness-changing pattern of the second color image. This ameliorates the problem of inaccurate determination of compensation data caused by different load characteristics (or different brightness distribution patterns) and enhances the compensation effect of demura.

In some embodiments, the brightness compensation device 180 provided in the present disclosure may further include a second compensating module for obtaining third compensating data and fourth compensating data corresponding to the display of the third color image on the display panel, obtaining second target compensating data based on the fourth compensating data and the third compensating data, and compensating the grayscale data of third color sub-pixels in the to-be-displayed image based on the second target compensating data.

Based on the aforementioned data compensation determination methods or brightness compensation methods, the present disclosure further provides a display device for implementing these methods, as further described in detail below.

Figure 19:
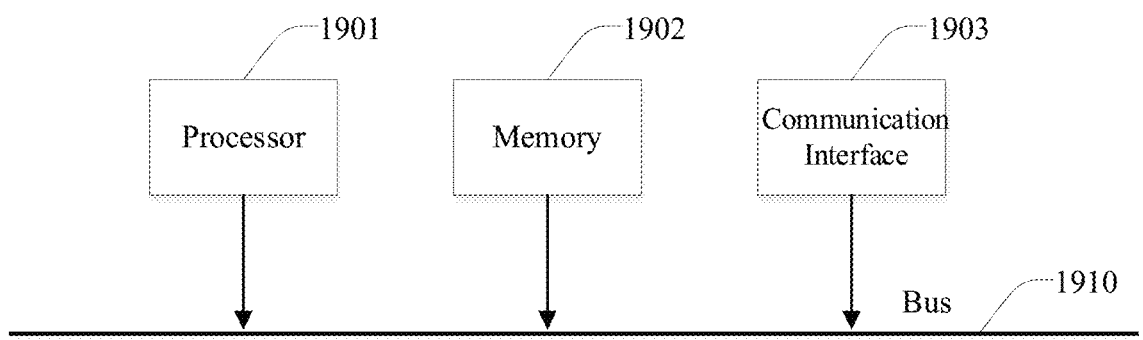
FIG. 19 is a schematic diagram illustrating the hardware architecture of a display device according to some embodiments of the disclosure.

FIG. 19 illustrates a schematic diagram of the hardware architecture of a display device according to some embodiments of the present disclosure.

The display device may include a processor 1901 and a memory 1902 storing computer program instructions.

Specifically, the processor 1901 may include a central processing unit (CPU), or an application-specific integrated circuit (ASIC), or may be configured to implement one or more integrated circuits for implementing the embodiments of the present disclosure.

The memory 1902 may include a large-capacity memory for storing data or instructions. For example, but not limited to, the memory 1902 may include a hard disk drive (HDD), a floppy disk drive, flash memory, optical disc, magnetic-optical disc, magnetic tape, or universal serial bus (USB) drive, or combinations of two or more thereof. In one example, the memory 1902 may include removable or non-removable (or fixed) media, or the memory 1902 may be a non-volatile solid-state memory. The memory 1902 may be located internally or externally to the display device.

In one example, the memory 1902 may be a read-only memory (ROM). In one example, the ROM may be mask-programmed ROM, programmable ROM (PROM), erasable PROM (EPROM), electrically erasable PROM (EEPROM), electrically alterable ROM (EAROM), or flash memory, or combinations of two or more thereof.

The memory 1902 may include read-only memory (ROM), random access memory (RAM), magnetic disk storage media devices, optical storage media devices, flash storage devices, electrical, optical, or other physical/tangible memory storage devices. Generally, the memory includes one or more non-transitory computer-readable storage media encoding software including computer-executable instructions, and when the software is executed (e.g., by one or more processors), it is operable to perform the operations described herein according to aspects of the present disclosure.

The processor 1901 reads and executes the computer program instructions stored in the memory 1902 to implement the methods/steps described in the aforementioned embodiments and achieve the corresponding technical effects achieved by the method embodiments. For the sake of brevity, these are not reiterated here.

In one example, the display device may also include a communication interface 1903 and a bus 1910. As shown in FIG. 19, the processor 1901, memory 1902, and communication interface 1903 are connected and communicate with each other through the bus 1910.

The communication interface 1903 is mainly used to enable communication between various modules, devices, units, and/or equipment in the embodiments of this disclosure.

The bus 1910 includes hardware, software, or a combination of both, which interconnects the components of the display device to each other. For example, but not limited to, the bus may include an accelerated graphics port (AGP) or other graphics bus, extended industry standard architecture (EISA) bus, front side bus (FSB), hyper transport (HT) interconnect, industry standard architecture (ISA) bus, InfiniBand, low pin count (LPC) bus, memory bus, Micro-Channel architecture (MCA) bus, peripheral component interconnect (PCI) bus, PCI-Express (PCI-X) bus, serial advanced technology attachment (SATA) bus, video electronics standards association local bus (VLB), or any other suitable bus or combination of two or more thereof. In appropriate cases, the bus 1910 may include one or more buses. Although specific buses are described and illustrated in this disclosure, any suitable bus or interconnect is considered within the scope of this disclosure.

Furthermore, in combination with the disclosed compensation data determination methods or brightness compensation methods in the aforementioned embodiments, this disclosure provides a computer-readable storage medium for implementation. The computer-readable storage medium stores computer program instructions, which, when executed by a processor, implement any of the aforementioned compensation data determination methods or brightness compensation methods. Examples of computer-readable storage media include non-transitory computer-readable storage media such as electronic circuits, semiconductor memory devices, ROM, random-access memory, flash memory, erasable ROM (EROM), floppy disks, CD-ROMs, DVDs, hard drives, etc.

It should be understood that this disclosure is not limited to the specific configurations and processes described and illustrated in the previous descriptions and figures. For conciseness, detailed descriptions of known methods are omitted. The embodiments described and illustrated in the aforementioned embodiments depict specific steps for illustration purposes, but the methods and processes of this disclosure are not limited to the specific steps described and illustrated. Those skilled in the art may make various changes, modifications, and additions, or change the order of steps, after understanding the spirit of this disclosure.

The functional blocks shown in the above structural diagrams may be implemented as hardware, software, firmware, or combinations thereof. When implemented as hardware, they may be, for example, electronic circuits, ASICs, appropriate firmware, plug-ins, or functional cards. When implemented as software, the elements of this disclosure are programs or code segments used to perform the required tasks. The programs or code segments may be stored in machine-readable media or transmitted via carrier signals over transmission media or communication links. Machine-readable media may include any media capable of storing or transmitting information. Examples of machine-readable media include electronic circuits, semiconductor memory devices, ROM, flash memory, EROM, floppy disks, CD-ROMs, DVDs, hard drives, optical fiber media, radio frequency (RF) links, and so on. Code segments may be downloaded via computer networks, such as the Internet or intranets.

The applicant of the present disclosure found that the load characteristic or brightness distribution pattern of the second color picture is different from that of the image used to validate the demura compensation effect. In the compensation data determination methods, brightness compensation methods, devices, and storage media disclosed in the disclosure, the third sub-frequency component of the second color image is replaced with the first sub-frequency component of the first color image. The third brightness data of the second color image is obtained based on the restoration of the first sub-frequency component and the fourth sub-frequency component. This can transform the load characteristic (or brightness distribution pattern) of the second color image to be the same or similar to the load characteristic (or brightness distribution pattern) of the image used to validate the demura compensation effect. The process compensates for or at least partially offsets the load characteristics difference of the second color image or difference in the brightness-changing pattern, which can ameliorate the inaccurate compensation data caused by different load characteristics (or brightness distribution pattern), thereby improving the compensation effect of demura.

It should also be noted that the exemplary embodiments mentioned in this disclosure describe certain methods or systems based on a series of steps or devices. However, this disclosure is not limited to the sequence of steps mentioned above. In other words, the steps may be performed in the order mentioned in the embodiments, or they may be performed in a different order, or even simultaneously.

The flowcharts and/or diagrams provided above, corresponding to the methods, devices (systems), and computer program products according to the embodiments of this disclosure, describe various aspects of this disclosure. It should be understood that each block in the flowcharts and/or diagrams, as well as combinations of blocks in the flowcharts and/or diagrams, may be implemented by computer program instructions. These computer program instructions may be provided to the processors of general-purpose computers, special-purpose computers, or other programmable data processing devices, to create a machine that enables the implementation of the specified functions/actions in one or more blocks of the flowcharts and/or diagrams when these instructions are executed by the processor(s) of the computer or other programmable data processing devices. The processor may be a general-purpose processor, a special-purpose processor, a dedicated disclosure processor, or a field-programmable logic circuit. It is also understood that each block in the diagrams and/or flowcharts, as well as combinations of blocks in the diagrams and/or flowcharts, may be implemented by dedicated hardware that performs the specified functions or actions, or by a combination of dedicated hardware and computer instructions.

The foregoing descriptions are merely some exemplary embodiments of this disclosure, and those skilled in the art will appreciate that, for the sake of convenience and conciseness, the specific operational processes of the systems, modules, and units described above may refer to the corresponding processes in the above-mentioned method embodiments and need not be elaborated here. It should be understood that the scope of protection of this disclosure is not limited thereto. Any person skilled in the art may easily come up with various equivalent modifications or substitutions within the technical scope disclosed in this disclosure, and these modifications or substitutions should be encompassed within the scope of protection of this disclosure.

What is claimed is:

1. A method of determining compensation data, comprising:
    obtaining first brightness data when a first color image is displayed on a display panel and second brightness data when a second color image is displayed on the display panel;
    performing a spatial domain-frequency domain conversion on the first brightness data to obtain a first frequency component corresponding to the first color image, wherein the first frequency component comprises a first sub-frequency component and a second sub-frequency component, and a frequency of the first sub-frequency component is lower than a frequency of the second sub-frequency component;
    performing the spatial domain-frequency domain conversion on the second brightness data to obtain a second frequency component corresponding to the second color image, wherein the second frequency component comprises a third sub-frequency component and a fourth sub-frequency component, and a frequency of the third sub-frequency component is lower than a frequency of the fourth sub-frequency component;
    replacing the third sub-frequency component with the first sub-frequency component and obtaining third brightness data of the second color image based on restoration of the first sub-frequency component and the fourth sub-frequency component; and
    obtaining first compensation data based on the third brightness data.

2. The method according to claim 1, wherein:
    the display panel comprises a plurality of regions sequentially arranged along a column direction of the display panel, wherein each region includes at least one row of sub-pixels;
    the first brightness data includes brightness data of a target region when the display panel displays the first color image; and
    the second brightness data includes brightness data of the target region when the display panel displays the second color image, wherein the target region is one of the plurality of regions.

3. The method according to claim 2, wherein:
    the plurality of regions include an x1-th region and an x2-th region, wherein x1 and x2 are both positive integers, and x1≠x2;
    wherein replacing the third sub-frequency component with the first sub-frequency component and obtaining the third brightness data of the second color image based on restoration of the first sub-frequency component and the fourth sub-frequency component includes:

when the target region is the x1-th region, a first sub-frequency component corresponding to the x1-th region is used to replace a third sub-frequency component corresponding to the x1-th region, and third brightness data corresponding to the x1-th region is obtained based on restoration of the first sub-frequency component and a fourth sub-frequency component corresponding to the x1-th region; and when the target region is the x2-th region, a first sub-frequency component corresponding to the x2-th region is used to replace a third sub-frequency component corresponding to the x2-th region, and third brightness data corresponding to the x2-th region is obtained based on restoration of the first sub-frequency component and a fourth sub-frequency component corresponding to the x2-th region; and wherein obtaining the first compensation data based on the third brightness data includes:

obtaining first compensation data corresponding to the x1-th region based on the third brightness data corresponding to the x1-th region; and obtaining first compensation data corresponding to the x2-th region based on the third brightness data corresponding to the x2-th region.

4. The method according to claim 1, wherein:

the display panel includes a plurality of regions sequentially arranged along a column direction of the display panel, and each region includes at least one row of sub-pixels;

the first brightness data includes average brightness data of at least one row of sub-pixels when the display panel displays the first color image, and the second brightness data includes brightness data of multiple rows of sub-pixels when the display panel displays the second color image;

wherein performing the spatial domain-frequency domain conversion on the second brightness data to obtain the second frequency component corresponding to the second color image includes:

performing a spatial domain-frequency domain conversion on brightness data of each row of sub-pixels to obtain a second frequency component corresponding to each row of sub-pixels; and wherein replacing the third sub-frequency component with the first sub-frequency component includes:

using the first sub-frequency component corresponding to each row of sub-pixels to replace the third sub-frequency component.

5. The method according to claim 1, further comprising:

determining second compensation data based on the second brightness data; and obtaining first target compensation data based on the first compensation data and the second compensation data.

6. The method according to claim 5, wherein obtaining the first target compensation data based on the first compensation data and the second compensation data includes:

dividing a difference between the first compensation data and the second compensation data into N first differential levels, with the N first differential levels corresponding to N load levels of an image displayed on the display panel, wherein each first differential level corresponds to one load level, and N is an integer greater than or equal to 0;

determining a current load level of a to-be-displayed image, and based on the current load level of the to-be-displayed image and a correspondence between a load level and a first differential level, determining a first target differential level corresponding to the current load level; and utilizing at least one of the first compensation data and the second compensation data as well as the first target differential level to determine the first target compensation data.

7. The method according to claim 6, wherein:

load levels include levels divided according to an average picture level (APL);

wherein determining the current load level of the to-be-displayed image includes:

obtaining grayscale data of the to-be-displayed image; and calculating a current APL of the to-be-displayed image based on the grayscale data of the to-be-displayed image; and determining the first target differential level corresponding to the current load level based on the current load level of the to-be-displayed image and the correspondence between a load level and a first differential level includes:

determining a first target differential level corresponding to the current APL based on the current APL level of the to-be-displayed image and a correspondence between an APL and a first differential level.

8. The method according to claim 6, wherein:

load levels include levels divided based on a proportion of sub-pixels emitting a target color in a displayed image;

wherein determining the current load level of the to-be-displayed image includes:

obtaining the grayscale data of the to-be-displayed image; and calculating a current proportion of sub-pixels emitting the target color in the to-be-displayed image based on the grayscale data of the to-be-displayed image; and wherein determining the first target differential level corresponding to the current load level based on the current load level of the to-be-displayed image and the correspondence between a load level and a first differential level includes:

determining a first target differential level corresponding to the proportion of sub-pixels emitting the target color based on the proportion of sub-pixels emitting the target color in the to-be-displayed image and a correspondence between a proportion of sub-pixels emitting the target color and a first differential level.

9. The method according to claim 8, wherein the sub-pixels emitting the target color include at least one type of red sub-pixels and blue sub-pixels, or the sub-pixels emitting the target color include green sub-pixels.

10. The method according to claim 6, wherein:

utilizing at least one of the first compensation data and the second compensation data as well as the first target differential level to determine the first target compensation data includes:

calculating the first target compensation data according to one of the following expressions:

$$\text{offset}=\text{offset}\_a+\delta*(\text{offset}\_b-\text{offset}\_a)/N, \text{ or}$$

$$\text{offset}=\text{offset}\_b-\delta*(\text{offset}\_b-\text{offset}\_a)/N,$$

wherein offset represents the first target compensation data, offset_a represents the first compensation data, offset_b represents the second compensation data, $\delta*(\text{offset}\_b-\text{offset}\_a)/N$ represents the first target differential level, and $0\leq\delta\leq N$.

11. The method according to claim 1, wherein:
the third brightness data include brightness values of the plurality of sub-pixels of the display panel; and
wherein obtaining the first compensation data based on the third brightness data includes:
for each sub-pixel, when a brightness difference between a brightness value of the sub-pixel and a reference brightness value is greater than a first preset threshold, determining a grayscale difference corresponding to the sub-pixel based on the brightness difference between the brightness value of the sub-pixel and the reference brightness value as well as a correspondence between a brightness difference and a grayscale difference, wherein the first compensation data include a grayscale difference corresponding to at least one sub pixel.

12. The method according to claim 1, further comprising:
obtaining fourth brightness data when the display panel displays a third color image;
performing a spatial domain-frequency domain conversion on the fourth brightness data to obtain a third frequency component corresponding to the third color image, wherein the third frequency component includes a fifth sub-frequency component and a sixth sub-frequency component, wherein a frequency of the fifth sub-frequency component is lower than a frequency of the sixth sub-frequency component;
replacing the fifth sub-frequency component with the first sub-frequency component, and based on restoration of the first sub-frequency component and the sixth sub-frequency component, obtaining fifth brightness data corresponding to the third color image; and
obtaining third compensation data based on the fifth brightness data.

13. The method according to claim 12, further comprising:
determining fourth compensation data based on the fourth brightness data; and
obtaining second target compensation data based on the fourth compensation data and the third compensation data.

14. The method according to claim 13, further comprising:
dividing a difference between the third compensation data and the fourth compensation data into N second differential levels, wherein each of the N second differential levels corresponds to a load level of an image displayed on the display panel, and one second differential level corresponds to one load level, wherein N is an integer greater than or equal to 0;
determining a current load level of a to-be-displayed image, and determining a second target differential level corresponding to the current load level based on the current load level of the to-be-displayed image and a correspondence between a load level and a second differential level; and
determining the second target compensation data based on at least one of the third compensation data and the fourth compensation data as well as the second target differential level.

15. The method according to claim 1, wherein the spatial domain-frequency domain conversion is performed by using Fourier transform.

16. A brightness compensation method, comprising: performing the method of determining compensation data according to claim 1;
obtaining second compensation data based on the second brightness data;
obtaining first target compensation data based on the first compensation data and the second compensation data; and
compensating grayscale data of sub-pixels emitting a second color in a to-be-displayed image based on the first target compensation data.

17. The method according to claim 16, further comprising:
obtaining corresponding third compensation data and fourth compensation data when the display panel displays a third color image;
obtaining second target compensation data based on the fourth compensation data and the third compensation data; and
compensating grayscale data of sub-pixels emitting a third color in the to-be-displayed image based on the second target compensation data.

18. A display device, comprising:
one or more processors; and a memory containing a computer program stored on the memory and executable by the one or more processors, wherein the computer program, when executed by the processor, implements the method of determining compensation data according to claim 1.

19. A non-transitory computer readable storage medium, containing a computer program that, when being executed, causes one or more processors to perform the method of determining compensation data according to claim 1.

20. A compensation data determination device, comprising:
a first acquisition module configured to obtain first brightness data when a first color image is displayed on a display panel and second brightness data when a second color image is displayed on the display panel;
a first conversion module configured to perform a spatial domain-frequency domain conversion on the first brightness data to obtain a first frequency component corresponding to the first color image, wherein the first frequency component includes a first sub-frequency component and a second sub-frequency component, and a frequency of the first sub-frequency component is lower than a frequency of the second sub-frequency component;
a second conversion module configured to perform the spatial domain-frequency domain conversion on the second brightness data to obtain a second frequency component corresponding to the second color image, wherein the second frequency component includes a third sub-frequency component and a fourth sub-frequency component, and a frequency of the third sub-frequency component is lower than a frequency of the fourth sub-frequency component;
a first restoration module configured to use the first sub-frequency component to replace the third sub-frequency component and obtain third brightness data of the second color image based on restoration of the first sub-frequency component and the fourth sub-frequency component; and
a first determination module configured to determine first compensation data based on the third brightness data.

21. A brightness compensation device, comprising: the compensation data determination device according to claim 20;

a second determination module configured to determine second compensation data based on the second brightness data;
a third determination module configured to determine first target compensation data based on the first compensation data and the second compensation data; and
a compensation module configured to compensata grayscale data of sub-pixels emitting a second color in a to-be-displayed image based on the first target compensation data.

* * * * *